July 8, 1958 R. W. COLLINS 2,842,659

MOBILE RADIO TELEPHONE SYSTEM

Filed Dec. 29, 1955 10 Sheets-Sheet 1

INVENTOR
R. W. COLLINS
BY John E. Cassidy
ATTORNEY

INVENTOR
R. W. COLLINS
BY John E. Cassidy
ATTORNEY

July 8, 1958 R. W. COLLINS 2,842,659

MOBILE RADIO TELEPHONE SYSTEM

Filed Dec. 29, 1955 10 Sheets-Sheet 3

INVENTOR
R.W. COLLINS
BY
John E. Cassidy
ATTORNEY

July 8, 1958 R. W. COLLINS 2,842,659

MOBILE RADIO TELEPHONE SYSTEM

Filed Dec. 29, 1955 10 Sheets-Sheet 4

INVENTOR
R. W. COLLINS
BY
John E. Cassidy
ATTORNEY

INVENTOR
R. W. COLLINS
BY John E. Cassidy
ATTORNEY

INVENTOR
R. W. COLLINS
BY
John E. Cassidy
ATTORNEY

July 8, 1958 R. W. COLLINS 2,842,659

MOBILE RADIO TELEPHONE SYSTEM

Filed Dec. 29, 1955 10 Sheets-Sheet 7

INVENTOR
R. W. COLLINS
BY
John E. Cassidy
ATTORNEY

INVENTOR
R. W. COLLINS
BY John E. Cassidy
ATTORNEY

INVENTOR
R. W. COLLINS
BY John E. Cassidy
ATTORNEY

INVENTOR
R. W. COLLINS
BY John E. Cassidy
ATTORNEY

United States Patent Office 2,842,659

Patented July 8, 1958

2,842,659

MOBILE RADIO TELEPHONE SYSTEM

Russell W. Collins, Baldwin, N. Y., assignor to Bell Telephone Laboratories, Incorporated, New York, N. Y., a corporation of New York Application December 29, 1955, Serial No. 556,348

17 Claims. (Cl. 250—6)

This invention is an improved radio telephone system such as may be employed, for instance, by a dispatcher in controlling a fleet of commercial mobile units or by a police department, in policing an area or a traffic artery such as a parkway or turnpike. The system comprises a central control station connected to a plurality of outlying radio stations by means of individual land lines for each outlying station. The land lines may be, for instance, two wire lines arranged for voice frequency two-way transmission. The two wires may be arranged to form a simplex circuit to afford a two-way control circuit between each outlying radio station and the central control station. Each of the outlying radio stations is equipped with a radio transmitter and a radio receiver to permit communication with mobile units and is also arranged for connection to a plurality of telephone circuits also by means of two-wire transmission circuits with simplex controls. The central control station has means for interconnecting it and the individual outlying stations in various groupings, so that the intercommunication may be general, over the whole system, or restricted to the components of the various groups. The central control station has control over the remote transmitters.

An object of the invention is the improvement of radio telephone systems.

The invention may be understood from the following description when read with reference to the associated drawings which taken together disclose a preferred embodiment in which the invention is presently incorporated. It is to be understood however, that the invention may be practiced in other embodiments which may be suggested by the present disclosure to those skilled in the art.

Figure 11:
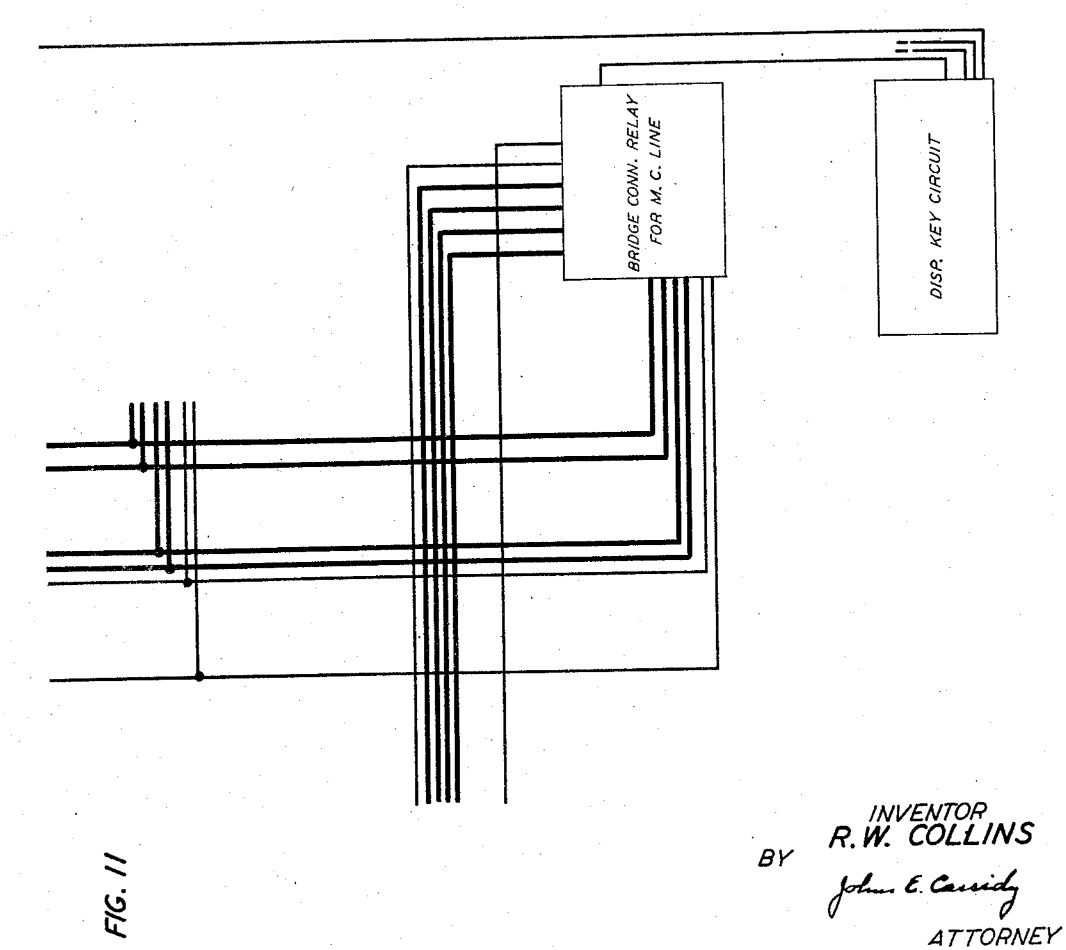
Figure 6:
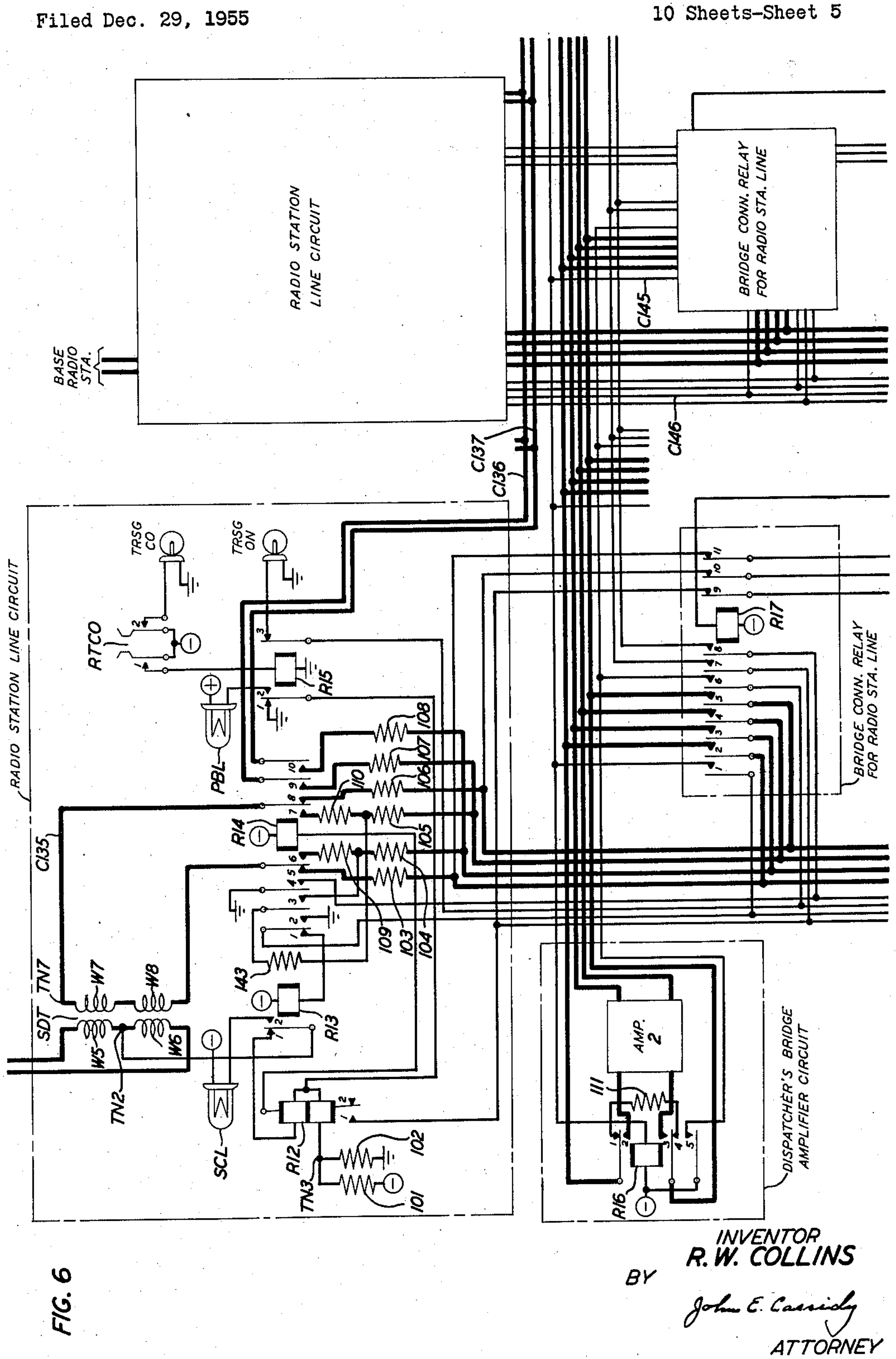
Figure 7:
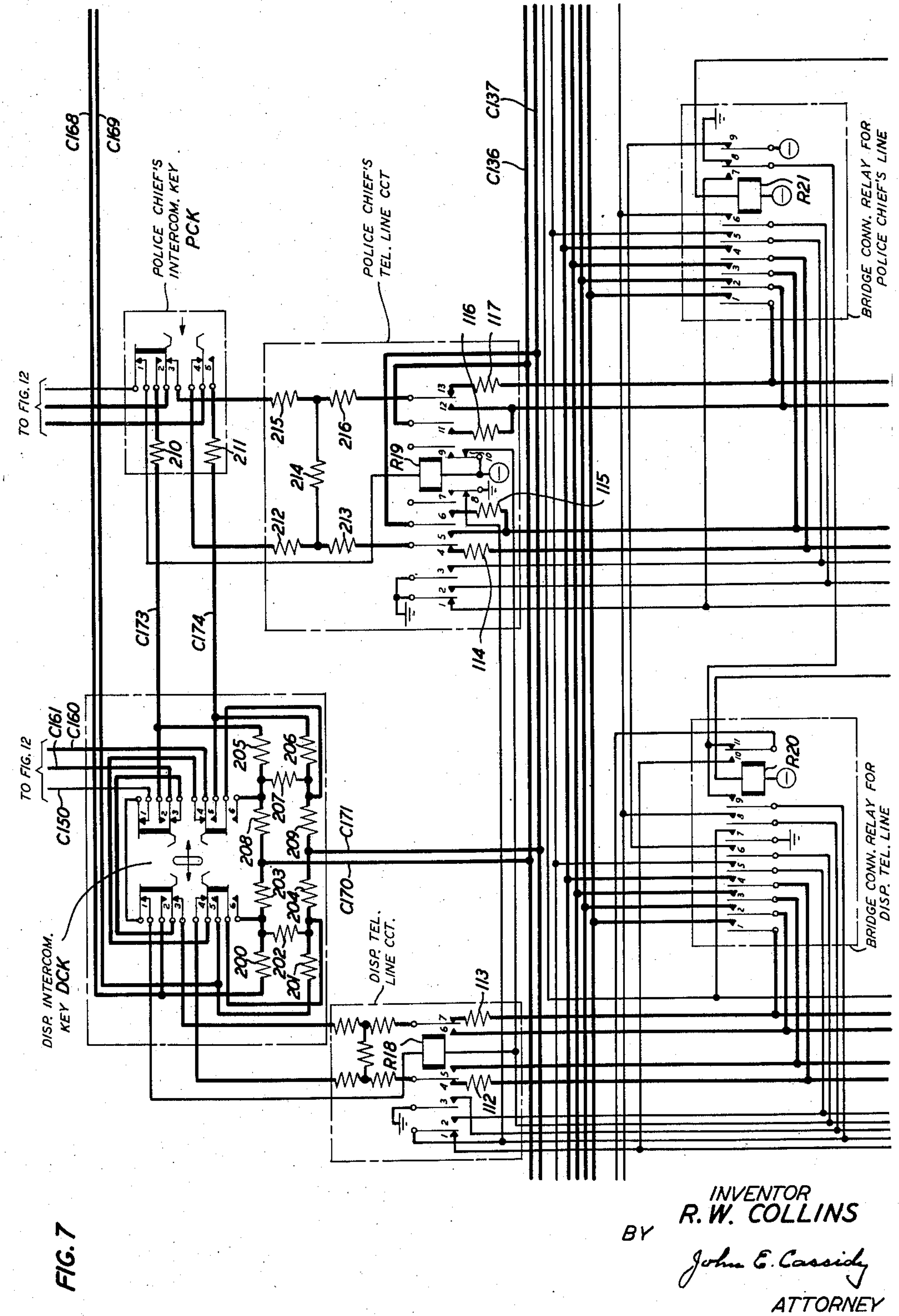
Figure 8:
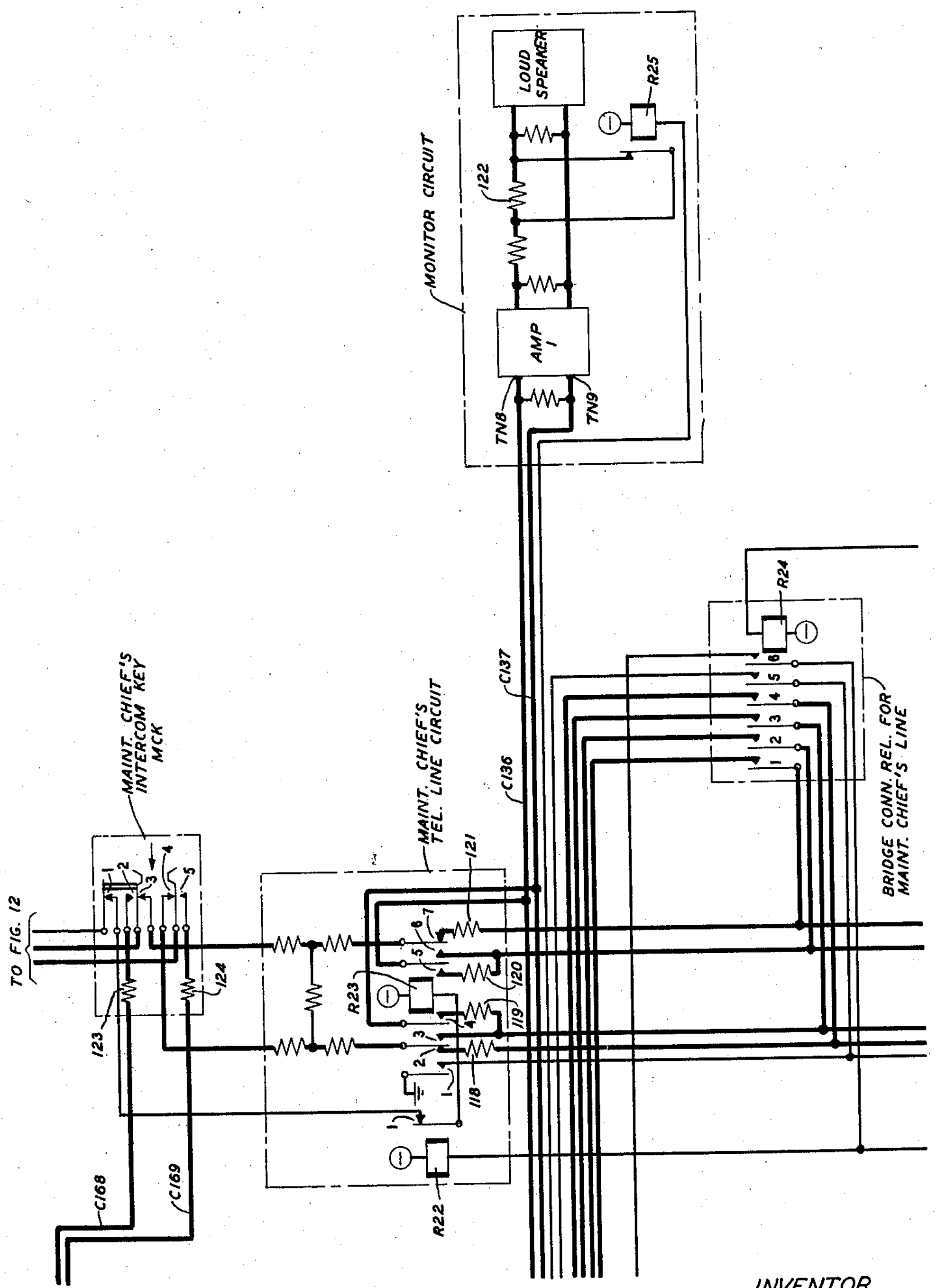
Figure 9:
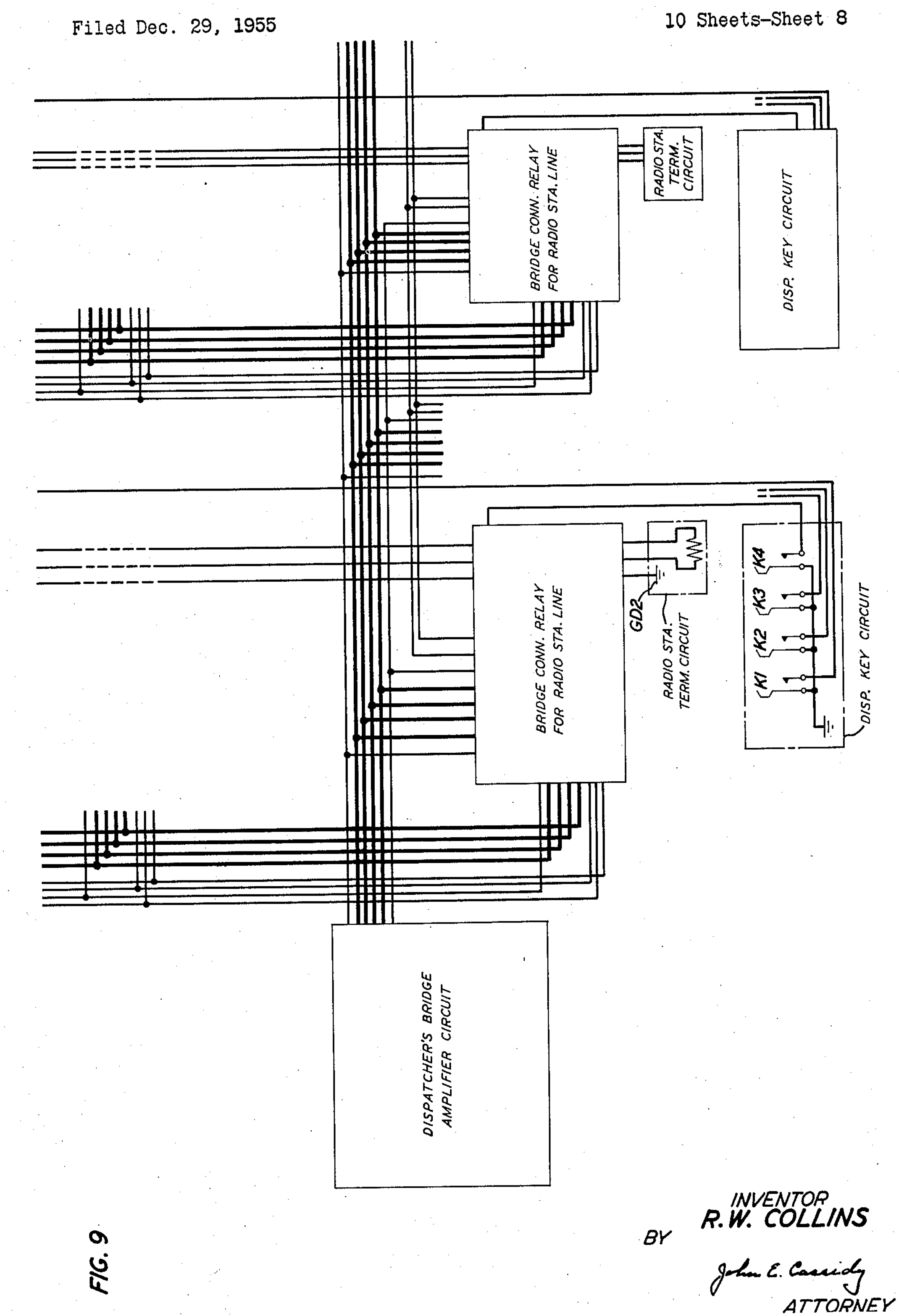
Figure 10:
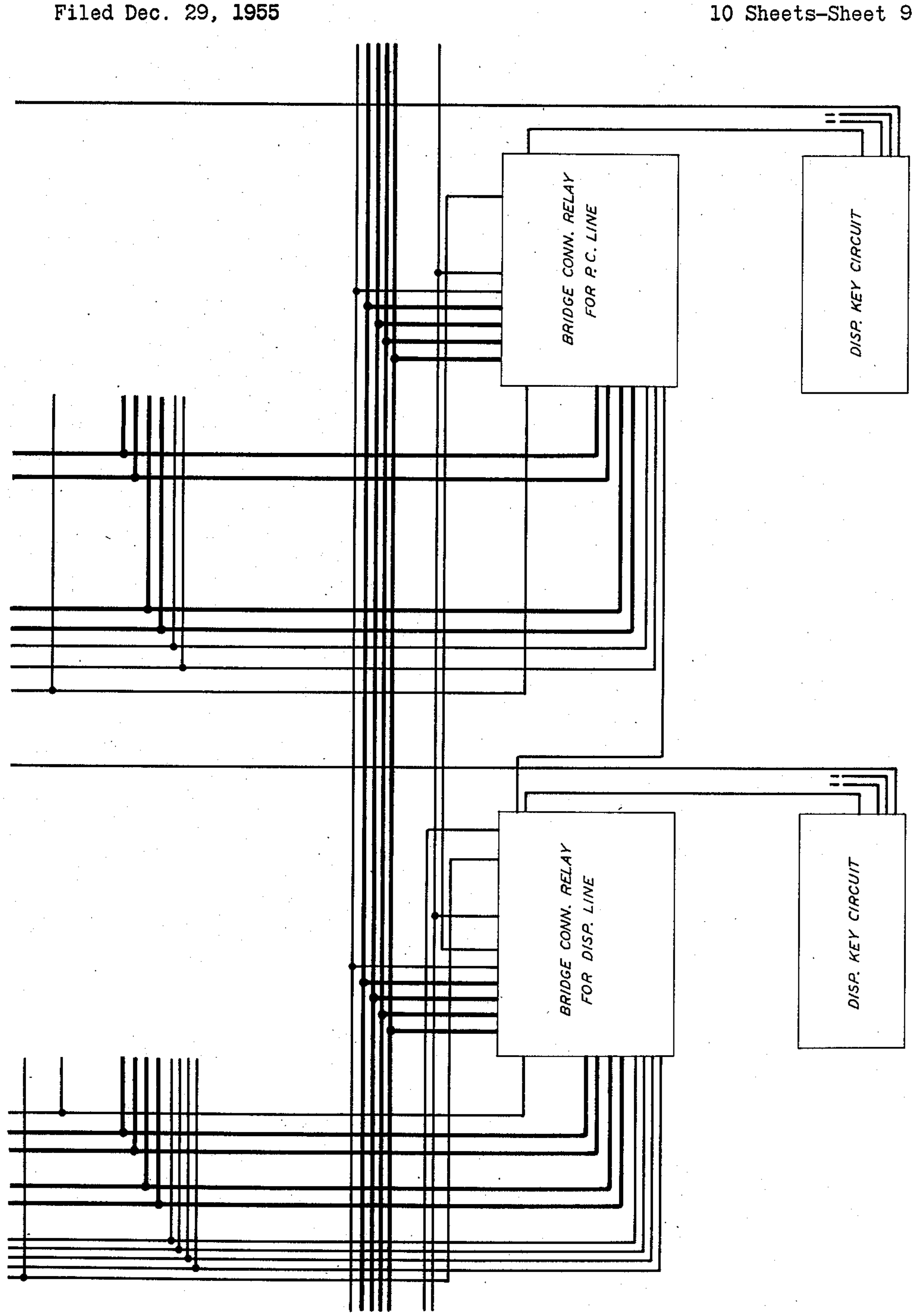
Figure 12:
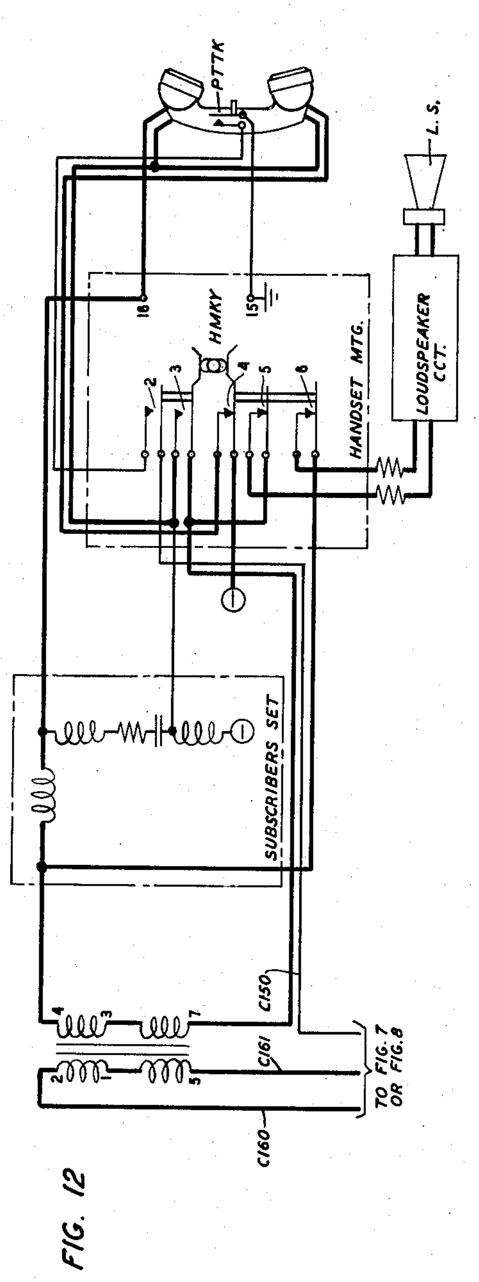
Figure 13:
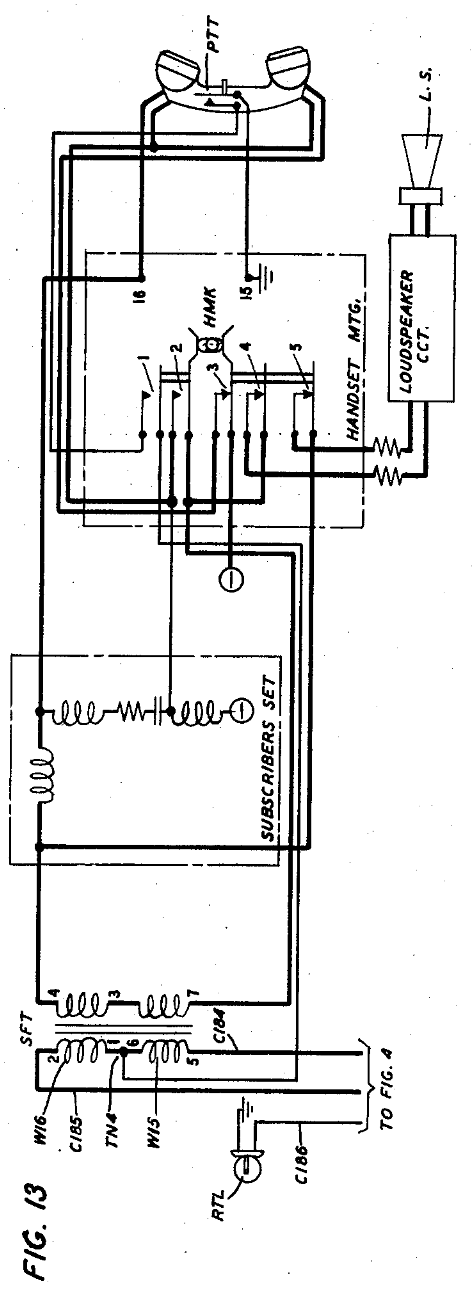

Figs. 6, 7, 8, 9, 10, 11 and 12, taken together, show the four bridge circuits and their complementary circuits at the central control station. Of these:

Fig. 6 shows the radio station line circuits, the bridge connecting relay circuits for the radio station line circuits and the dispatcher's bridge amplifier circuit;

Fig. 7 shows the circuits for interconnecting both the dispatcher's telephone circuit and the police chief's telephone circuit to the system, which circuits comprise an intercommunicating key circuit, a telephone line circuit and a bridge connecting relay circuit individual to each;

Fig. 8 shows the circuit for interconnecting a maintenance chief's telephone circuit to the system, comprising an intercommunication key circuit, a telephone line circuit and a bridge connecting relay circuit, all individual to the maintenance chief's telephone circuit, and shows also a monitor circuit;

Fig. 9 shows a dispatcher's bridge amplifier circuit, two bridge connecting relay circuits for radio station lines and two dispatcher's key circuits, all represented by captioned rectangles;

Fig. 10 shows, by means of captioned rectangles, two more bridge connecting relay circuits, one for a dispatcher's line and one for the police chief's line and two dispatcher's key circuits;

Fig. 11 shows, by means of captioned rectangles, another bridge connecting relay circuit for a maintenance chief's line and a dispatcher's key circuit;

Fig. 12 shows a telephone circuit for use at the central control station by the dispatcher, the police chief and the maintenance chief; and Fig. 13 shows a telephone circuit for use with an outlying radio station bridge circuit.

Figure 1:
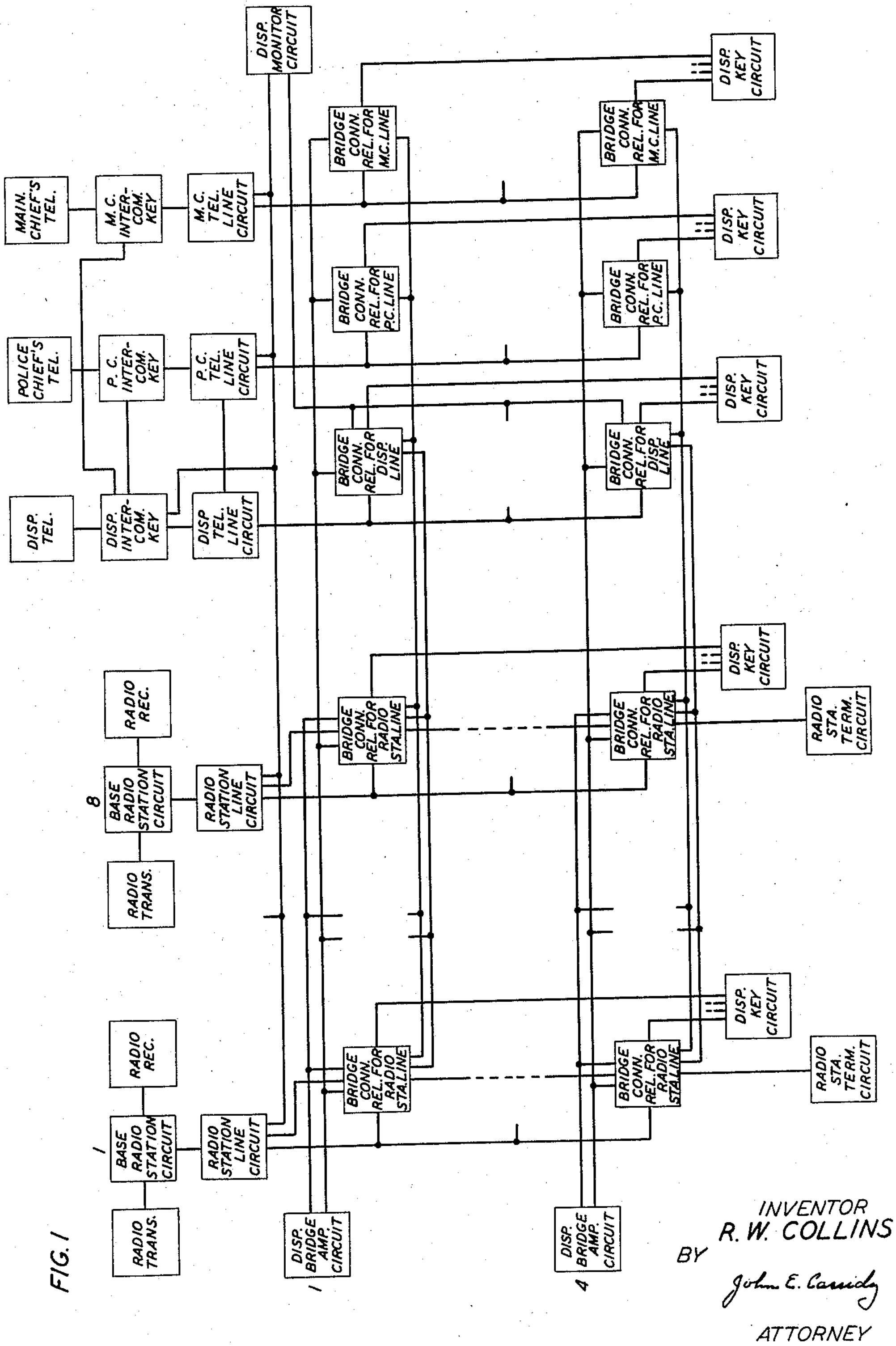
Fig. 1 is a diagram of the system used in explaining the relationship of its major circuit component, which circuits are shown as captioned rectangles in the figure.

Refer now to Fig. 1 which shows diagrammatically the major components of the system and their relationship to each other by means of captioned rectangles. Prior to a detailed description of the operation of the system, the system will be described generally through reference to Fig. 1.

It is assumed for purpose of description that the system comprises eight outlying radio stations and one central control station. Only two of the outlying radio station bridge circuits to be called hereinafter at times base radio station circuits are illustrated in Fig. 1. These are shown at the upper left in the figure and are identified as base radio station circuits 1 and 8, respectively. It is to be understood that stations 2 to 7, or whatever number may be employed in the system are interconnected to it in the same manner as indicated for stations 1 and 8. Each of the outlying or base radio station circuits comprises a radio transmitter, a radio receiver, any number of wire-connected telephone circuits, such as ten, for instance, and a bridge circuit for interconnecting these elements in various manners. Each of these outlying or base radio station circuits is extended to the central control station where it connects directly to an individual radio station line circuit and to a bridge connecting relay circuit individual to each of the bridges at the central control station.

In general, at the central control station there are a number, such as three, telephone circuits. These may be a police chief's telephone circuit, a dispatcher's telephone circuit and a maintenance chief's telephone circuit and facilities which permit these telephone circuits to be connected to the eight outlying base radio stations in any desired grouping. These facilities at the central control station essentially comprise four bridge circuits by means of which the various outlying radio stations and the three telephone circuits at the central control station may be connected in any desired combination. Of the four bridge circuits at the central control station only two are shown, bridge circuits 1 and 4. Bridge circuits 2 and 3 are similarly arranged. Each of the four bridges at the central control station has an individual bridge connecting relay for each line to an outlying radio station. Four such bridge connecting relay circuits are indicated in Fig. 1. One is for line 1 to associate it with bridge 1, a second is for line 1 to associate it with bridge 4, a third and a fourth are shown to associated line 8 with bridges 1 and 4, respectively.

For an eight-line four-bridge system 32 such bridge connecting relays would be required.

At the upper right in Fig. 1 are shown three telephone circuits, an individual telephone circuit for the dispatcher, the police chief and the maintenance chief, respectively.

Each of these three telephone circuits has an individual intercommunication key circuit and an individual telephone line circuit. Each of the three telephone circuits has also an individual connecting relay circuit for each bridge. Thus for the present four-bridge circuit, there would be twelve bridge connecting relay circuits provided for the three telephone circuits only six of which are indicated in Fig. 1.

Each of the four bridges has an individual amplifier circuit called a dispatcher's bridge amplifier circuit. In Fig. 1 two of the four bridge amplifiers are shown on the left side of the figure, one for bridge 1 and one for bridge 4. Two other bridge amplifiers would be required, one for each of bridges 3 and 4. Each of the eight lines and each of the three telephones has an individual dispatcher's key circuit, which comprises an individual key for each bridge connecting relay circuit, by means of which the eight lines and the three telephone circuits may be grouped together through the four bridges in any desired manner.

The system of Fig. 1 comprises also a dispatcher's monitor circuit, shown at the right in the figure, which affords means for monitoring on the system. At the bottom of the figure are shown radio station terminating circuits one of which is connected to each line when the line is not effectively connected to any bridge to afford the proper impedance termination.

Figure 2:
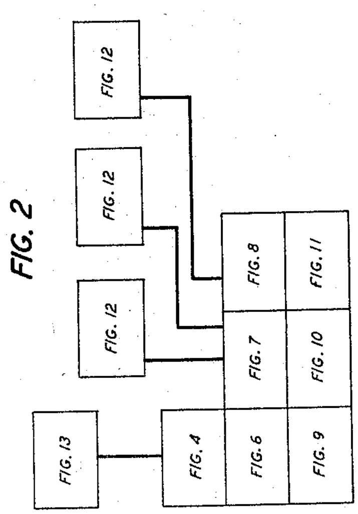
Fig. 2 is a diagram showing one disposition of the circuit figures of the system.
Figure 4:
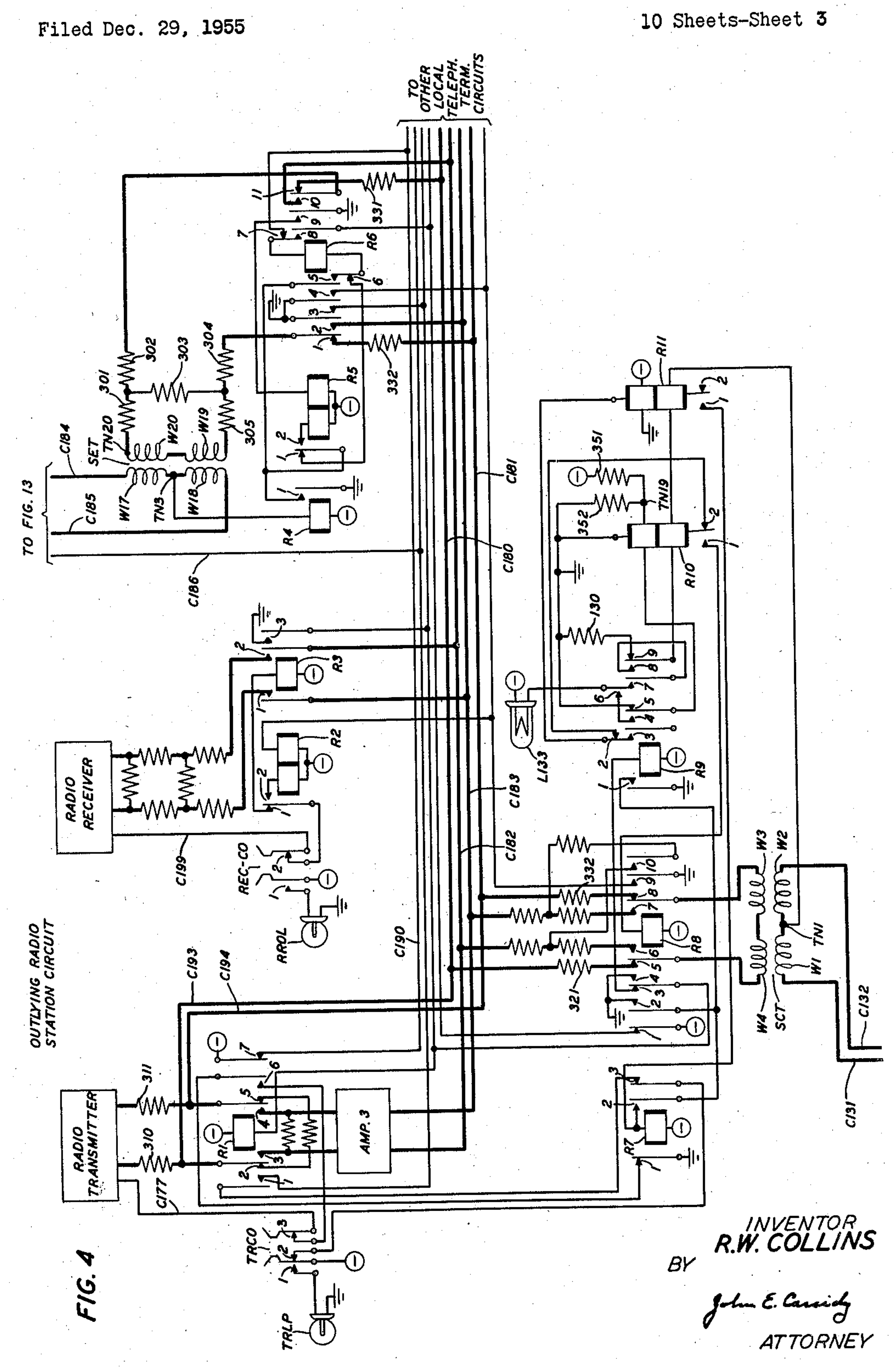
Fig. 4 is the outlying radio station bridge circuit, one of which is located at each radio station in the system.

When the figures are disposed as shown in Fig. 2, Fig. 4 shows an outlying radio station circuit including an individual radio transmitter and receiver and Fig. 13 shows an individual telephone circuit therefor. It is to be understood that normally there may be up to ten or more telephone circuits so connected. In the system, as mentioned heretofore, there may be any number of such outlying radio stations, such as eight, for instance. When eight are provided, seven other circuits such as Fig. 4 and its individual telephone circuit Fig. 13 will be connected to the central control station. The central control station equipment is shown in Figs. 6 to 12. Each outlying radio station bridge circuit, such as Fig. 4, is connected by means of a two-wire voice frequency circuit to an individual radio station line circuit. In Fig. 6 one radio station line circuit is shown at the upper left in detail. Another is indicated by a captioned rectangle at the upper right in Fig. 6. It is to be understood that each outlying radio station circuit will be connected by its individual two-wire line to an individual radio station line circuit at the central station. At the central control station, in the present embodiment, there are assumed to be four dispatchers' bridges. One of these is shown in detail extending across the lower portions of Figs. 6, 7 and 8 to the monitor circuit shown at the right in Fig. 8. Two telephone circuits, each in accordance with Fig. 12, one for the dispatcher and the other for the police chief, are shown connected to Fig. 7. The maintenance chief's telephone circuit, also in accordance with Fig. 12, is shown connected to Fig. 8. Extending across the lower portion of Figs. 9, 10 and 11, another dispatcher's bridge circuit is shown, the components of which are indicated by captioned rectangles. Intermediate the two bridges shown on the drawings, it is to be understood that any number of other bridges desired may be interposed. The circuits are arranged in such manner that each outlying radio station bridge circuit is connectable to the monitoring circuit shown at the right in Fig. 8 without being connected to any of the bridges at the central control station. Each outlying radio station circuit is also connectable to any of the bridges. This function is performed by the bridge connecting relay circuit for a radio station line, such as the one shown in detail at the lower middle portion of Fig. 6. There will be one such bridge connecting relay circuit for each line for each bridge. Three other such circuits are indicated by captioned rectangles, one at the lower right in Fig. 6 and two in Fig. 9. Each of the telephone circuits at the central control station, namely the dispatcher's police chief's and maintenance chief's, has an individual bridge connecting relay circuit for each bridge. There is a dispatcher's key circuit, comprising an individual key for each bridge, associated with each radio station line circuit and each of the three telephone circuits. One of these dispatcher's key circuits is shown in detail in the bottom middle portion of Fig. 9. It is individual to the outlying radio station circuit and the radio station line circuit shown in detail in Fig. 4 and Fig. 6, respectively. It comprises four keys K1, K2, K3 and K4. Each of the four keys controls an individual relay in one of the four bridge connecting relay circuits. By means of these relays in the bridge connecting relay circuit the outlying radio station circuit in Fig. 4 may be connected to any of the four bridges. Other dispatcher's key circuits and bridge connecting relay circuits can connect their respective lines to any one or more of the four bridges. There is a dispatcher's key circuit individual to each of the three telephone circuits, also. Each of these circuits also has four keys, an individual key for each of the four bridge connecting relay circuits, by means of which any one of the three telephone circuits may be connected to any of the four bridges. These dispatchers' key circuits are indicated by captioned rectangles at the bottom in Figs. 10 and 11. A dispatcher's bridge amplifier circuit is individual to each bridge. One such amplifier circuit is shown in detail at the lower left in Fig. 6, which is individual to bridge 1. Another, individual to bridge 4, is indicated by a captioned rectangle at the lower left in Fig. 9.

The outlying radio station circuit of Fig. 4 comprises a radio transmitter, a radio receiver, and a number of telephone terminating circuits, one only of which is shown in detail at the upper right in Fig. 4, which one is shown connected to the telephone circuit of Fig. 13. A group of conductors are shown extending to the right in Fig. 4 which connect to other local telephone terminating circuits such as the one shown in detail in Fig. 4. Each of these other circuits would be connected to an individual telephone circuit, Fig. 13. It is to be understood that there may be any number of telephone circuits, as required, connected to any outlying base radio station circuit of Fig. 4, such as ten telephone circuits, for instance. Individual to each line, interconnecting an outlying station to a central control station, there is a simplex control conductor, such as connected to terminal TN1 of transformer SCT in Fig. 4 and another, such as connected to terminal TN2 of transformer SDT, in the radio station line circuit in Fig. 6. These conductors connect through control relays in their respective circuit for supervising transmission between the outlying radio station bridge circuit and the control bridge circuits. Each two-wire telephone circuit connected to an outlying radio station circuit, such as that extending from the telephone terminating circuit at the upper right in Fig. 4 to the connected telephone circuit of Fig. 13, is also simplexed. One connection extends from terminal TN3 of transformer SET through the winding of relay R4. The simplex termination in the telephone circuit of Fig. 13 extends from terminal TN4 of transformer SFT through contact 1 of key HMK, when closed, and the contact of the push-to-talk key PTT, when closed, to ground.

Among other features the system disclosed provides: (1) means whereby any fixed or mobile station can talk to all other fixed or mobile stations associated with an outlying radio station bridge on a push-to-talk basis without connection to a dispatcher's bridge; (2) means whereby the dispatcher can connect any combination of radio station bridges to any dispatcher bridge circuits, four for instance, to permit a maximum of four simultaneous conversations; (3) means for remotely disabling any base station radio transmitter from the dispatcher's control station at the central control station; (4) means for intercommunication between base radio station bridges using a particular dispatcher's bridge circuit with any number of the radio station transmitters remotely disabled; and (5) means whereby a particular telephone station at the central control station, such as a police chief's telephone station, may preempt a single bridge circuit or any number of the bridge circuits as desired, even when calls are in progress thereover.

The system also provides means whereby calls are handled on a push-to-talk basis and are transmitted to all stations and mobile units connected to a particular bridge circuit. When any circuit or mobile unit is transmitting, all others, except the dispatcher's station and the police chief's station, are locked out. Any call originated by the dispatcher's station or the police chief's station will interrupt a call in progress and prevent all stations or mobile units from interfering with the call. The three telephone stations provided at the central control station are supplied with intercommunication key circuits which permit the assigned parties to communicate directly without actuating any of the bridges. The radio station bridge circuit at each of the outlying stations is provided with means for disabling its radio transmitter and radio receiver.

Associated with each line at the central control station is a circuit which permits remotely disabling the station radio transmitter at the connected outlying station.

*Detailed description of operation of the circuits at the central control station.—Circuit conditions when system is idle*

When the system is in an idle circuit condition, the armatures of all relays such as relay R12, shown at the upper left in Fig. 6, are in engagement with their contacts 2 as shown. Each simplex control circuit associated with a line interconnecting an outlying radio station and the central control station is grounded at both ends. The circuit at the outlying radio station may be traced from ground in the lower middle portion of Fig. 4 through resistor 130, contact 9 of relay R9, bottom winding of relay R10, bottom winding of relay R11, terminal TN1, windings W1 and W2 of coil SCT, in parallel, conductors C131 and C132 in parallel, windings W5 and W6 of coil SDT in parallel, terminal TN2, contact 1 of relay R13, top winding of relay R12 and contact 1 of relay R15 to ground. A biasing circuit may be traced from ground through contact 1 of relay R15 and the bottom winding of relay R12 to terminal TN3 in a potentiometer circuit. The potentiometer circuit may be traced from battery through resistor 101, terminal TN3 and resistor 102 to ground. The effect of the biasing current in the bottom winding of relay R12 tends to actuate the armature of relay R12 to engage with its contact 2, as shown. It will be observed that the simplex circuit traced in the foregoing was terminated at both ends in ground. For this condition, the armature of relay R12, and the armatures of all relays corresponding to relay R12 in other radio station line circuits, will be in engagement with their respective contacts 2. The current flowing in the biasing circuit through the lower winding of relay R12 is adjusted so as to prevent operation of relay R12 from the effect of current flowing in the top winding of relay R12 due to a maximum difference of 25 volts in ground potential, between ground at the outlying station and ground at the central control station.

*Call originating at outlying radio station with interconnecting circuit not connected to the dispatcher's telephone circuit*

When a call is originated at either a wired telephone circuit or a mobile unit connected to an outlying radio station bridge, relay R9, in Fig. 4, is actuated in a manner to be described hereinafter. A circuit may then be traced from negative battery, which may be 130 volts, for instance, through the filament of lamp L133, contact 7 of relay R9 and contact 8 of relay R9 to the path which has been traced from this point over the simplex circuit and through the top winding of relay R12, in Fig. 6, to ground on contact 1 of relay R15, actuating the armature of relay R12 to engage with its contact 1. This establishes a circuit from ground GD2, shown in the lower middle portion of Fig. 9, through an individual contact, such as contact 9 of relay R17 in each of the bridge connecting relay circuits for a radio station line, in series, contact 1 of relay R12 and the winding of relay R14 to battery operating relay R14. The operation of relay R14 connects the monitoring circuit shown at the right in Fig. 8 to the outlying radio station. The circuit may be traced from terminal TN7, at the upper left in Fig. 6, through conductor C135, contact 7 of relay R14, resistor 110, resistor 105, resistor 107, contact 9 of relay R14 and conductor C136 which connects to the top terminal TN8 of amplifier AMP1 in the monitor circuit. The return path may be traced from lower terminal TN9 of amplifier AMP1 in the monitor circuit through conductor C137, contact 10 of relay R14, resistor 108, resistor 104, resistor 109, contact 6 of relay R14 and windings W8 and W7 of coil SDT to terminal TN7. The monitoring circuit which comprises a loudspeaker connected to the output of the amplifier is thereby effectively connected to the outlying radio station circuit and the dispatcher may monitor the call originating at the outlying station which will be heard through the loudspeaker. Attention is called to the fact that the circuit, whereby the monitor circuit is connected to the outlying radio station circuit did not pass through any bridge. It is particularly pointed out, as will be made clear hereinafter, that when all bridge connecting relays, such as relay R17, are released, none of the outlying radio station circuits is connected to any bridge. Further, it will be observed that when all of the bridge connecting relays associated with the three telephone circuits and the bridges are in the released condition as indicated on the drawing, no one of the three telephone circuits at the central control station is connected to any bridge.

*Call originating at an outlying radio station connected to a dispatcher's bridge circuit*

As distinguished from the connection decribed in the foregoing, an outlying station which is connected to one of the bridge circuits may originate a call. In order that an outlying radio station circuit be connected to a bridge, it is necessary that one of the keys in the dispatcher's key circuit, such as shown in the bottom middle portion of Fig. 9, be operated. It will be assumed that key K1 in the dispatcher's key circuit is actuated to close its contact. A circuit may then be traced from ground through the contact of key K1 and the winding of relay R17 to battery operating relay R17. This effectively connects the signaling and speech transmission leads from the associated radio station line circuit, in this case the one shown in the upper left in Fig. 6, to the dispatcher's bridge amplifier circuit, shown at the lower left in Fig. 6. One side of the speech transmission circuit may be traced from terminal TN7, through conductor C135, contact 7 of relay R14, resistor 110, resistor 105 and contact 4 of relay R17 to the bottom terminal of the input of amplifier AMP2 in the dispatcher's bridge amplifier circuit. The return path may be traced from the upper terminal of amplifier AMP2 through contact 3 of relay R17, resistor 104, resistor 109, contact 6 of relay R14 and windings W8 and W7 of coil SDT to terminal TN7. The signaling circuits will be described hereinafter.

When a call is originated at the distant end of the line, the armature of relay R12 is operated to engage its contact 1, as described. Since relay R17 is now operated, a circuit is established from battery through the winding of relay R14, contact 1 of relay R12, contact 7 of relay R17, contact 11 of relay R20 and contact 8 of relay R21 to ground operating relay R14. Attention is called to the fact that this ground on contact 8 of relay R21 is available only if the dispatcher's and police chief's bridge connecting relays R20 and R21, respectively, individual to the top bridge, are not operated. The operation of relay R14 establishes a circuit from ground through contact 2 of relay R14, contact 1 of relay R17, and the winding of relay R16 to battery operating relay R16. The operation of relay R16 and relay R17 also establishes a circuit from battery through contact 5 of relay R16, contacts, such as contact 6, of all operated relays, such as relay R17, associated with the top bridge, through contacts, such as contact 3, of all relays, such as relay R15, connected to the top bridge and through the filaments of their associated lamps TRSG-ON to ground, lighting all such lamps, to indicate at the central control station that the radio transmitters at the outlying stations connected to the lines associated with the lighted lamps have been turned on, in a manner to be described hereinafter. Until relay R16 was operated, all line circuits connected to the top bridge circuit were terminated in resistor 111. After the operation of relay R16 all of these lines are connected to the output of amplifier AMP2 in the dispatcher's bridge amplifier circuit. It is pointed out that the maintenance chief's telephone circuit in Fig. 8 is connectable to any bridge, through the operation of relay R23, if the associated bridge connecting relay, such as relay R24 for the maintenance chief's line is operated. It is desirable that the maintenance chief be prevented from interfering with a call incoming from one of the outlying stations. For this reason, the present circuit is provided with a relay R22 which disengages relay R23 from control by the maintenance chief. This is performed by opening contact 1 of relay R22 over a circuit which may be traced from battery through the winding of relay R22, contact 6 of relay R24, which it is assumed is presently operated, contact 8 of relay R17 and contact 4 of relay R14 to ground. A circuit may also be traced from ground through contact 2 of relay R14, associated with the line which is assumed to be presently calling and contact 1 of its associated relay R17, from which point the circuit is extended in parallel through all conductors, such as conductor C145, contacts, such as contact 1, of all relays such as relay R17 in the bridge connecting relay circuit, conductors, such as conductor C146, contacts, such as contact 1 of relays such as relay R14 in the radio station line circuit, all such other relays R14 being released, and the windings of relays, such as relay R13 to battery, operating the relays corresponding to relay R13 in all other radio station line circuits connected to the top bridge. It is particularly pointed out that relay R13 is operated in the radio station line circuit individual to the line which is actually calling and that the relays corresponding to relay R14 in all other radio station line circuits associated with the same bridge will be in the released condition so that the path through their contacts 1 will be available to operate each relay R13 in these other circuits. The operation of relays, such as relay R13, in these other radio station line circuits will establish a circuit from battery, which may be, for instance, negative 130 volts, through the filament of a lamp, such as lamp SCL, in all of the other line circuits, a contact, such as contact 2, on the operated R13 relays and out over the simplex circuit to the other outlying radio stations. In response to this, the radio transmitters at all of these other outlying radio stations will be turned on in a manner to be described. Further, the operation of the relays, such as relay R13, associated with these other stations, by opening their contacts 1, will prevent these other outlying stations, assumed to be connected to the top bridge, from initiating a call while the call presently being described is in progress.

When relay R14 in the circuit which is presently making the call is operated, incoming speech from the distant radio station is applied to the input of amplifier 2 in the dispatcher's bridge amplifier circuit over a circuit heretofore traced. The output of the dispatcher's bridge amplifier circuit is connected in parallel through the individual relays, such as relay R17 and R14, associated with each of the other lines, to the lines to the other outlying stations. A typical circuit may be traced from contact 2 of relay R16, through contact 2 of relay R17, resistor 103, contact 5 of relay R14, windings W8 and W7 of coil SDT, conductor C135, contact 8 of relay R14, resistor 106, contact 5 of relay R17 and contact 3 of relay R16. With relay R16 operated, its contacts 2 and 3 are connected across the output of amplifier AMP2.

It has been shown that the operation of relay R14 connects the monitor circuit in Fig. 8 to a calling line. The monitor circuit is connected to the calling line under the present conditions in the same manner as heretofore described. This permits the dispatcher to monitor the call, even though his telephone circuit may not be presently connected to the bridge. When relay R14, in the calling circuit is operated, it connects resistor 143 in shunt across the junctions between resistors 105 and 110 and resistors 104 and 109 and resistor 143 forms a shunt arm in a transmission pad circuit comprising these resistors, to reduce the incoming speech to the desired level. Since the shunt arms corresponding to resistor 143 in all of the other radio station line circuits connected to the bridge are open, they do not present a low impedance bridge across the amplifier input.

*Call originated from dispatcher's telephone station connected to the dispatcher's bridge circuit*

Prerequisite to the connection of the dispatcher's telephone station circuit to any bridge, it is necessary that an individual key, such as key K1, in the dispatcher's key circuit be actuated to operate a bridge connecting relay for the dispatcher's telephone line, such as relay R20, in a manner which should be understood from the foregoing. Assuming that relay R20 is operated, the dispatcher's telephone circuit may be connected to the associated bridge by the operation of relay R18, in the dispatcher's telephone line circuit, under control of the dispatcher's telephone circuit of Fig. 12. In order to operate relay R18, the dispatcher operates key HMKY in his telephone set and operates his push-to-talk button PTTK on his telephone instrument. This establishes a circuit from ground through the contact of the push-to-talk button PTTK, contact 2 of key HMKY, conductor C150, contact 1 of the right-hand portion of key DCK, contact 1 of the left-hand portion of key DCK, winding of relay R18 and contact 10 of relay R19 to battery operating relay R18. It is pointed out that relay R19 will be in the released condition, and its contact 10 will be closed to supply battery for the operation of relay R18, only if the police chief has not taken over the circuit. A circuit may now be traced from battery through the winding of relay R16, contact 5 of relay R20, contact 2 of relay R18 and contact 8 of relay R19 to ground, actuating relay R16. This same ground through closed contact 8 of the police chief's telephone line circuit relay R19 is connected through contact 2 of relay R18, contact 5 of relay R20, contact 1 of all relays, such as relay R17, associated with the bridge, through contact 1 of all relays, such as relay R14, assuming that no line connected to the same bridge is presently calling, and the winding of all relays, such as relay R13, to battery, operating all relays such as relay R13. This, as has been shown, connects battery over the simplex circuit to the distant radio stations turning on the individual radio transmitter for each station connected to the bridge. If the police chief is talking, the ground from contact 8 of relay R19 will not be available. However, if the police chief is not operatively connected to all bridges, it is desirable that the dispatcher should have access to any bridge to which the police chief is not operatively connected. This is arranged by providing a ground through contact 8 of any relay, such as relay R21, which may be released, and which is associated with the same bridge to which the dispatcher is connected, contact 9 of the corresponding dispatcher's relay, such as relay R20, which connects in parallel to the path extending to ground through contact 8 of relay R19. This parallel ground connection is available to operate relay R16 and relay R13 under such conditions. If, when a dispatcher calls, any call originated by a distant station connected to the same bridge is in progress, the armature of the relay, such as relay R14, individual to the line which originated the call will be operated to close its contact 1. The operating path for all relays, such as relay R14, for this condition was traced through contact 11 of relay R20. This ground is available only if relay R20 is released. If a dispatcher is connected to a particular bridge the relay, such as relay R20, is operated and the path is extended through contact 10 of relay R20, contact 1 of relay R18 and contact 7 of relay R19 to ground. Since relay R18 is operated and its contact 1 is open, relay R14 is released and relay R13 will operate connecting negative battery to the simplex of the connected line. It will be recalled that when an outlying station originates a call, negative battery, negative 130 volts, for instance, is connected to the simplex at the outlying station and the simplex control conductor at the central control station, after passing through the top winding of relay R12 thereat, is terminated in ground connected to contact 1 of relay R15. The negative 130-volt battery is still connected to the simplex at the outlying station when negative 130-volt battery is connected to it at the central control station. Under this condition, for reasons to be explained hereinafter, control of the associated equipment at the outlying station is released and control is assumed by the dispatcher's bridge circuit at the central control station. Operation of relay R16 connects the output of amplifier AMP2 to the talking pair of all line circuits as described above. Relay R22 is again operated in the maintenance chief's telephone line circuit for reasons which should be understood from the foregoing. Relay R25 is operated over a circuit from ground through contact 7 of relay R20, and the winding of relay R25 to battery, to remove the shunt around resistor 122 in series with the output of amplifier AMP1, to reduce the monitor loudspeaker level by approximately 10 decibels, whenever the dispatcher's telephone circuit is connected to any of the bridges.

*Call originated from police chief's telephone station connected to the dispatcher's bridge circuit*

The police chief's telephone station is connected to one of the bridges by operation of the appropriate dispatcher's key circuit, such as that shown in detail at the bottom of Fig. 9. Ground from the operated key contact actuates a relay such as relay R21. This connects the transmission and signaling leads of the police chief's telephone line circuit to the corresponding bridge. When a call is originated by the police chief's telephone circuit, ground is applied from the telephone circuit to the path extending through contact 1 of the police chief's intercommunication key PCK and the winding of relay R19 to battery operating relay R19. The operation of relay R19, by closing its contacts 5 and 12, connects the two-wire transmission line from the police chief's telephone to the input of amplifier AMP2 through contacts 2 and 3 of relay R21. Ground is applied through contact 3 of relay R19 and contact 5 of relay R21 to parallel branches. One of the parallel branches extends through the winding of relay R16 to battery operating relay R16. This connects the output of amplifier AMP2 to the input circuit of all two-wire lines to the outlying radio stations. Other parallel branches extend through contacts, such as contact 1, of relays, such as relay R17, and contacts, such as contact 1, of all relays, such as relay R14 which are in the released condition, and through the windings of relays, such as relay R13 to battery, operating all such relays and connecting the simplex controls to the lines. If the bridge connecting relay, such as relay R21, associated with the same bridge to which the police chief is assumed to be connected, is operated, ground is applied also through contact 2 of relay R19, contact 6 of relay R21, contact 6 of relay R24 and the winding of relay R22 to battery, operating relay R22 to disable the maintenance chief's circuit so that it cannot interfere with the police chief's call.

It is pointed out that the ground on contact 1 of relay R19 through contact 7 of relay R21 was substituted for the direct ground on contact 8 of relay R21, so as to be available to operate any relay, such as relay R14, at any time during the interval while the police chief's bridge connecting relay R21 is operated, except while the police chief's telephone circuit is actually connected to the bridge through the operation of relay R19.

If a call had been in progress from the dispatcher's telephone circuit, relay R18 would have been operated from battery supplied from contact 10 of relay R19. With relay R19 operated, relay R18 releases and transfers control of the bridge to which the dispatcher had been connected, from the dispatcher to the police chief. If an outlying station had originated a call, and at the time a dispatcher's connecting relay, such as relay R20, had been operated, to enable the dispatcher's telephone circuit to be connected to the same bridge to which the outlying radio station was connected, but the dispatcher's telephone line circuit relay R18 was not operated at the time, to actually connect his telephone circuit to the bridge, ground for operating the relay, such as relay R14, might be supplied from either of two sources depending upon the condition of the police chief's circuit. The first source is from contact 8 of relay R19 through contact 1 of relay R18, contact 10 of relay R20, contact 7 of relay R17, contact 1 of relay R12 and through the winding of relay R14 to battery. This ground is available if the police chief's telephone line circuit relay R19 is not operated, which is the condition which prevails when the police chief's circuit is not actually operatively connected to any bridge. The police chief's telephone circuit, if and when connected, however, may be operatively connected to some bridge other than the bridge to which some outlying radio station is presently connected. In this case a relay, such as relay R21, associated with any bridge to which the police chief is not connected will be in the released condition, as shown. Ground will then be connected through contact 8 of relay R21, contact 9 of relay R20, contact 1 of relay R18 and over the remainder of the path heretofore traced from this point through the winding of a relay, such as relay R14, to battery, to operate the relay when its associated outlying radio station initiates a call. If, under this condition, a bridge connecting relay, such as relay R21, is operated, but relay R19 is not operated, the direct ground on contact 8 of relay R21 is replaced by the ground from contact 1 of relay R19 through contact 7 of relay R21. Thus even though a particular bridge is arranged to be connected to a police chief's telephone circuit, when the police chief in fact calls, until he does call, an outlying radio station may call and be connected through the same bridge to all other outlying stations associated with the bridge. When the police chief does in fact actuate his circuit to be connected to any bridge, both the grounds on contact 1 and the battery on contact 10 of relay R19 are disconnected. Under this condition it is not possible for any outlying station to effectively originate a call through any bridge or bridges to which the police chief is connected at the time. It is to be understood, however, that ground through contact 8 of any relay, such as relay R21, which is not operated and to which the police chief is not effectively connected, when his relay R19 is operated, is available to actuate any relay, such as relay R14, connected to such a bridge, when a line associated with such a relay R14 originates a call.

After a relay, such as relay R14, connected to a line which has originated a call is released, as a result of preemption of the bridge of overcall, as it is sometimes termed, its associated relay R13 is operated and negative battery, such as negative 130 volts, is connected to the simplex control conductor in a manner which should be understood from the foregoing, so that the preempting circuit may take control of the distant radio transmitter. Simultaneously the talking conductors of the line associated with the relay, such as relay R14, are connected to the output of the amplifier AMP2.

*Base station radio transmitter cut-off*

Arrangements are provided for disabling the radio transmitter at any outlying radio station in response to a condition applied at the central control station when necessary. These transmitters are disabled by the operation of the radio transmitter cut-off key RTCO in the radio station line circuit associated with the line to the radio station at which the radio transmitter is to be cut off. One key RTCO is shown in the radio station line circuit in the upper middle portion of Fig. 6. There is one such key individual to each line to the outlying radio stations. When key RTCO is actuated to close its associated contacts, a circuit is established from battery through contact 1 of key RTCO and the winding of relay R15 to ground operating relay R15. When relay R15 is operated, positive battery, positive 130 volts, for instance, is connected through the filament of lamp PBL and contact 2 of relay R15 to the apex of the top and bottom windings of relay R12. The positive battery replaces the ground formerly connected to this terminal of the simplex and the effect of the substitution disables the radio transmitter at the outlying radio station in a manner to be explained hereinafter. The effects of the positive battery in the two windings of relay R12 are balanced, so that relay R12 is not operated. When key RTCO is operated, lamp TRSG–CO is lighted over a circuit from battery through contact 2 of key TRCO and the filament of the lamp to ground. This serves as a signal at the central control station that the radio transmitter connected to the distant end of the associated line is cut off.

*Call originated at a base radio station bridge with the radio transmitter thereat disabled*

When a call is originated at an outlying radio station, ground on the simplex lead is replaced with negative battery, negative 130-volt battery, for instance, at the outlying station. It will be recalled that to disable the transmitter at an outlying radio station, positive battery, positive 130 volts, for instance, was connected to the simplex at the central control station. The simplex was terminated in ground at the outlying station. Under this condition, when negative battery is substituted for the ground at the distant station, the current through the top winding of relay R12 increases sufficiently to overcome the increased current in the biasing winding, permitting relay R12 to operate, in the same manner as described in the foregoing. When relay R12 at the central control station operates, a call is received at the central station as described.

*Call originated from a dispatcher's bridge circuit with the radio transmitter at the outlying station disabled*

When a call is originated from the dispatcher's bridge circuit, ground is furnished to operate relay R13 as described in the foregoing. Operation of relay R13 replaces the positive battery on the simplex with negative battery. This reversal of battery on the simplex will actuate the outlying base radio station bridge circuit without turning on its radio transmitter. This will be described in detail hereinafter. In all other respects the call is handled as described in the foregoing.

*Intercommunication between the police chief or the maintenance chief and the dispatcher*

When the police chief or maintenance chief wishes to talk to the dispatcher without actuating any of the bridge circuits, the respective intercommunication key circuit PCK or MCK is actuated to its alternate position to that shown in Figs. 7 and 8, respectively. Operation of either one of these keys transfers the telephone circuit, individual to each, from its respective bridge connecting relays directly to the monitor loudspeaker through the normal contacts of the dispatcher's intercommunication key DCK. It will be assumed first that the maintenance chief's key MCK is actuated to its alternate position. Under this condition a circuit may be traced from the maintenance chief's telephone circuit, Fig. 12, through the two talking conductors, in parallel, contacts 2 and 5 of operated key MCK, resistors 123 and 124, conductors C168 and C169, which connect to open contacts 2 and 5 of the left-hand portion of the dispatcher's intercommunication key DCK, and in parallel through the pad comprising resistors 200, 201, 202, 203 and 204, conductors C170 and C171 and conductors C136 and C137 to the input of amplifier AMP1 in the monitoring circuit. The police chief can then voice-call the dispatcher. When the dispatcher answers the call by operating his key DCK to the position alternate to that shown in Fig. 7, the loudspeaker leads are short-circuited through resistor 202 and contact 6 of the left-hand portion of key DCK. Resistors 203 and 204 may total 5000 ohms, for instance. When contacts 2 and 5 of the left-hand portion of key DCK are closed, the maintenance chief's circuit is extended through these contacts, contacts 3 and 4 of the right-hand portion of key DCK, which is in its normal position, as shown in Fig. 7, and conductors C160 and C161 to the dispatcher's telephone circuit of Fig. 12. The circuit is equipped with a resistor pad, comprising resistors 123 and 124, Fig. 8, to pad out the volume from the police chief's circuit to the same level as that of the bridge outputs, and this pad in series with the pad comprising resistors 200, 201, 202, 203 and 204 pad out the volume, from the dispatcher's intercommunication line to the loudspeaker, to the same level as that applied to the loudspeaker by the bridge circuits.

The police chief's intercommunicating circuit is arranged in substantially the same manner as is that of the maintenance chief. When the police chief actuates his key PCK to its alternate position, his telephone talking circuit, Fig. 12, is connected, in parallel, through contacts 2 and 5 of key PCK, resistors 210 and 211 to open contacts 2 and 5 of the right-hand portion of key DCK, and, in parallel, through the pad comprising resistors 205, 206, 207, 208 and 209, conductors C170 and C171 and conductors C136 and C137 to amplifier AMP1, so that the police chief also may voice-call the dispatcher. When the dispatcher responds by actuating the right-hand portion of his key DCK, resistor 207 is interconnected through contact 6 of the right-hand portion of key DCK in shunt across the monitor circuit. Conductors C173 and C174 are extended through contacts 2 and 5 of the right-hand portion of key DCK and conductors C160 and C161, respectively, to the dispatcher's telephone circuit of Fig. 12.

*Operation of circuit at radio station.—Call originated by local telephone station connected to an outlying radio station bridge*

Refer now to Figs. 4 and 13, with Fig. 13 disposed above Fig. 4, so that conductors C184, C185 and C186 in the two figures are interconnectable. A call is originated by any local telephone station, such as that of Fig. 13, of which there may be ten, for instance, connected to any outlying radio station bridge, by actuating the push-to-talk key PTT, of the respective telephone circuit, shown at the right in Fig. 13. Switchhook HMK in Fig. 13 will have been actuated to its alternate position, when the telephone handset is removed from its cradle. A circuit may then be traced from ground through the closed contact of key PTT, contact 1 of key HMK, terminal TN4, windings W15 and W16 of coil SFT in parallel, conductors C184 and C185, in parallel, coils W17 and W18 in parallel, terminal TN3 and the winding of relay R4 to battery operating relay R4. The operation of relay R4 establishes a circuit from ground through contact 1 of relay R4, contact 1 of relay R5, contact 6 of relay R6, winding of relay R6, contact 7 of relay R6, conductor C190 and contact 7 of relay R1 to battery operating relay R6. Relay R6 when operated locks over a circuit from ground through contact 1 of relay R4, contact 5 of relay R6, winding of relay R6, contact 8 of relay R6 and contact 1 of relay R8 to battery. The operation of relay R6 also establishes a circuit from terminal TN20 in the upper right-hand portion of Fig. 4 through resistors 301 and 302 of a pad, contact 10 of relay R6 and conductor C182 to the left-hand terminal of the amplifier AMP3. The return circuit may be traced from the right-hand terminal of AMP3 through contact 2 of relay R6, resistors 304 and 305 of the pad and windings W19 and W20 of coil SET to terminal TN20. This connects the line incoming from the telephone set to the input of amplifier AMP3. The operation of relay R6 establishes a circuit from ground through contact 4 of relay R6 and the right-hand winding of relay R2 to battery operating relay R2. It is to be understood that associated with each outlying radio station, in addition to the land telephone connections, the operation of which we are presently describing, there are a number of mobile units, police cars, for instance. The mobile units will be individually equipped with a radio transmitter and receiver. Each one may initiate a call at any time which will be received by the radio receiver, shown at the upper midle portion of Fig. 4. When such a call is received, a relay, not shown, associated with the radio receiver applies ground to conductor C199 and the circuit is extended through contact 2 of the receiver cut-off key REC–CO, contact 1 of relay R2 and the winding of relay R3 to battery operating relay R3 and connecting the radio receiver to the input of amplifier AMP3. It is desirable that this should be prevented when another call is in progress. This is the reason for the operation of relay R2 when relay R6 is operated in response to a call from a land telephone line. The operation of relay R2 by opening its contact 1 prevents the operation of relay R3 and thereby prevents the possible mutilation of calls in progress, which would result from superimposing a call incoming from a mobile unit on the system simultaneously. The operation of relay R6 closes a circuit from ground through contact 3 of relay R6 to parallel branches. One of the branches extends through the winding of relay R1 to battery operating relay R1. The other branch extends through contact 3 of relay R8 and the winding of relay R9 to battery operating relay R9. After the operation of relay R6, its ground control circuit for its locking path is transferred, so that it is supplied from contact 1 of relay R4 directly to contact 5 of relay R6, without passing through contact 1 of relay R5. The operation of relay R6 supplies ground through contact 9 of relay R6 and the right-hand winding of relay R5 to battery operating relay R5. The operation of relay R1, by closing its contacts 3 and 4, connects the output of amplifier AMP3 through resistors 310 and 311, respectively, to the radio transmitter, so that the call originated by a local wire-connected telephone circuit to the bridge circuit of the associated outlying radio station may be broadcast by its radio transmitter to the mobile units individual to the radio station. The operation of relay R1 also connects the output of amplifier AMP3 through conductor C193 and C194, resistors 321 and 332, and contacts 5 and 8 of relay R8 to windings W4 and W3 of coil SCT, so that the call from the local telephone station, after amplification, is transmitted over the two-wire line to the central control station. Conductors C193 and C194 connect to conductors C180 and C181 which are multipled to other local telephone terminating circuits associated with other land telephone lines connected to the same outlying radio station, in the same manner as indicated in the telephone terminating circuit shown at the upper right in Fig. 4. It is to be understood that under conditions such as are presently being described, the relay corresponding to relay R6 in each of these other telephone terminating circuits will be in the released condition and conductors C180 and C181 will be extended through resistors, such as resistors 331 and 332, and through contacts, such as contacts 1 and 11, of relays, such as relay R6, respectively, to the lines which extend to the telephone circuits. Each of the land-connected telephone circuits, therefore, associated with the same outlying radio station will hear the call assumed to be incoming from another such station to the local bridge. The operation of relay R1 establishes a circuit from ground through contact 1 of relay R7, contact 6 of relay R1, contact 3 of the transmitter cut-off key TRCO, conductor C177 and the winding of a relay, not shown, in the radio transmitter to battery thereat, to operate the relay and turn on the radio transmitter. The operation of relay R1 extends a circuit from battery through contact 2 of key TRCO, contact 3 of relay R7, contact 1 of relay R1, conductor C186 and the filament of lamp RTL to ground, lighting the lamp, as a signal that the radio transmitter has been turned on. The operation of relay R1, by opening its contact 7, disconnects battery from conductor C190. It will be recalled that the battery supplied through contact 7 of relay R1 was employed to operate relay R6 in the local telephone terminating circuit associated with the line assumed to be presently making the call. Now that this local telephone has control of the circuit, it is desirable that other local telephones be prevented from interfering. This is effected by disconnecting the battery from contact 7 of relay R1. The operation of relay R9 supplies negative battery, such as negative 130 volts, for instance, through the filament of lamp L133, contact 7 of relay R9, contact 8 of relay R9, bottom windings of relay R10 and R11, terminal TN1 and over the simplex, to the central control station to initiate an incoming call as previously described. Relay R11 in the circuit just traced, operates under this condition. The operation of relay R11 at this time does not, in turn, effect the operation of relay R7, when contact 1 of relay R11 is closed, as the circuit through contact 1 of relay R11 and the winding of relay R7 to battery is open at contact 2 of relay R9, which is presently operated. It was explained in the foregoing how the circuits at the central control station responded to the incoming call, the mode of operation of which is presently being described at the outlying radio station.

On occasions a line to a land station connected to a local telephone circuit associated with an outlying radio station may be accidentally grounded. That is to say, a ground may be accidentally applied to one or the other of conductors such as conductors C184 or C185. This will establish a circuit through either winding W17 or W18 and the winding of relay R4 to battery operating relay R4. It has been explained that when a land-connected telephone line has control of a bridge circuit at an outlying radio station, other land-connected telephone lines and mobile units associated with the same radio station are excluded from access to the system. Further, it has been shown that any bridge at the central control station having once been appropriated by an incoming call remains under its control until the calling party relinquishes control, unless the police chief or the dispatcher intervenes. It is desirable that appropriation of the circuit, due to accidental grounding, to the exclusion of other circuits should be prevented. Under such circumstances the circuit is arranged so that the dispatcher may actuate his push-to-talk button and operate relay R8 in a manner to be described hereinafter. Operation of relay R8 removes battery from contact 1 of relay R8 by means of which any relay corresponding with relay R6 has been locked. This releases the locked relay. It was explained heretofore than when relay R6 operated, it operated relay R5. Relay R5, when operated, locks over a path from ground through contact 1 of relay R4, contact 2 of relay R5 and the left-hand winding of relay R5 to battery. While relay R5 is operated, the operating path for relay R6 remains open at contact 1 of relay R5. If the accidental ground was of momentary duration, relay R4 will be released and relay R6 upon being released cannot reoperate. If the accidental ground condition is permanent, however, relay R5 will remain locked to ground through contact 1 of relay R4. However, only the individual circuit which has been accidentally grounded will be disabled and the remainder of the system can function normally.

*Incoming calls from mobile units*

Incoming calls from mobile units cause the operation of relay R3 as heretofore described. Relay R3 when operated connects the radio receiver to the input of amplifier AMP3. Relay R3 when operated furnishes ground through contact 3 of relay R3 and the winding of relays R1 and R9, in parallel, to battery operating relays R1 and R9, which function was described for a call incoming from a land connected telephone circuit.

*Call originated from the dispatcher's bridge at central control station*

When a call is originated from the dispatcher's bridge, negative battery, as described, is connected to the simplex lead at the central control station and current therefrom passes through the bottom windings of relays R11 and R10, contact 9 of relay R9 and resistor 130 to ground. The armature of relay R10 operates to engage its contact 1. The armature of relay R11 remains in engagement with its contact 2, because of the polarity of the current applied to its winding. A circuit may then be traced from ground through contact 1 of relay R10 and the winding of relay R8 to battery operating relay R8. Relay R8 when operated, by opening its contacts 5 and 8, disconnects the output of the amplifier AMP3 from the line to the central control station and, by closing its contacts 6 and 7, connects the line to the central station to the input of the amplifier AMP3. Closure of contact 9 of relay R8 supplies ground through the right-hand winding of relay R2 to battery operating relay R2, which functions as heretofore described, to prevent intrusion of a call from a mobile unit into the presently busy system. Ground from contact 4 of relay R8 operates relay R1 to prevent calls from land lines from interfering in the same manner as heretofore described.

*Calls originated by the dispatcher or police chief*

If the system is idle, calls originated by the dispatcher or police chief are completed at the outlying radio station in the same manner as other incoming calls from the central control station. If a call is in progress from the outlying radio station, relays R9 and R11 will be operated. Relay R9 applies the negative battery to the simplex, in a manner heretofore described. The armature of relay R10 is maintained in engagement with its contact 2 by the effect of current in its bottom winding for this condition. The operation of relay R9 reverses the direction of the current in the top winding of relay R10. Before the operation of relay R9 the right-hand terminal of relay R10 was connected to terminal TN19 in a potentiometer circuit which may be traced from negative battery through resistor 351, terminal TN19 and resistor 352 to ground. From terminal TN19 the circuit extended through the top winding of relay R10 and contact 5 of relay R9 to ground. After the operation of relay R9 the left-hand terminal of the top winding of relay R10 is connected through contacts 4 and 6 of relay R9 and the filament of lamp L133 to negative battery, which may be negative 130 volts, for instance. The magnitude of the negative potential applied to the left-hand terminal of the top winding of relay R10 is greater than the magnitude of the negative potential of terminal TN19, so that the direction of the current through the top winding reverses and its effect now tends to actuate the armature of relay R10 to engage with its contact 1. However, the counter effect of the current in the bottom winding of relay R10 is preponderant, so the armature of relay R10 is maintained in engagement with its contact 2. It was explained heretofore that when the dispatcher or police chief makes a call over a bridge which is at the time under control of a call incoming from an outlying radio station, negative battery of the same magnitude as is connected to one end of the simplex at the outlying station, 130 volts, for instance, is applied to the other end of the simplex, at the central control station. Under this condition no current flows through the bottom winding of relay R10 and the effect of the now reversed current in the top winding of relay R10, which was effective before it was reversed and while ground was connected to each end of the simplex, to maintain the armature of relay R10 in engagement with its contact 2, now, after reversal, actuates the armature of relay R10 to engage with its contact 1. The operation of relay R10 operates relay R8, as heretofore described, which connects the talking conductors of the line incoming from the central control station to the input of the amplifier AMP3. Operation of relay R8 releases relay R9, connecting ground to the simplex and transfers control of the bridge at the outlying station to the dispitcher or police chief.

*Base station radio receiver cut-off*

Operation of the receiver cut-off key REC–CO opens a lead from the codan relay, not shown, connected to the radio receiver in Fig. 4 to cut off the receiver and prevent calls from being received from the mobile radio units associated with an outlying radio station. Simultaneously the radio receiver cut-off lamp RROL is lighted over an obvious circuit to indicate the condition.

*Outlying station radio transmitter cut-off*

Operation of the radio transmitter cut-off key TRCO disconnects the ground supplied from contact 1 of relay R7 through contact 6 of relay R1, when operated, and contact 3 of key TRCO to the winding of the radio transmitter plate control relay, not shown, at the radio station, shutting off the radio transmitter. The opening of contact 2 of key TRCO also disconnects battery from a path which was heretofore traced through the filament of lamp RTL, Fig. 13, preventing the lamp from lighting when relay R1 is operated, to indicate the condition. Lamp TRLP is lighted over an obvious circuit whenever key TRCO is operated.

The transmitter at each outlying radio station can be disabled by the central control station. It has been explained that when positive battery, positive 130 volts, for instance, is applied to the simplex at the central control station, relay R11 operates but relay R10 does not. A circuit may then be traced from ground through contact 2 of relay R10, contact 2 of relay R9, contact 1 of relay R11 and the winding of relay R7 to battery operating relay R7. It has been shown that the operation of relay R7 disables the radio transmitter and prevents lamp RTL, Fig. 13, from lighting.

*Call originated at base station radio station bridge with transmitter remotely disabled*

It was shown that when a call is originated at an outlying station, relay R6 operates, in turn operating relays R1 and R9. These relays operate in the usual manner even when the transmitter is disabled in response to a condition applied from the central control station. Relay R9 applies negative battery to the simplex bridge. However, since relay R7 was operated from the central control station, to turn off the radio transmitter, it is desirable that this condition be maintained. Relay R7 is therefore held operated from ground through contact 1 of relay R9 and contact 2 of relay R7 and the winding of relay R7 to battery. This maintains the disabled condition of the radio transmitter and the darkened condition of lamp RTL, Fig. 13. The negative battery at the radio station end of the simplex meets positive battery at the central station end, and the call to the central control station may proceed since this affords control of the central control station bridge in a manner described.

*Call originated from a dispatcher with the transmitter remotely disabled*

When a call is originated at the central control station with the radio transmitter at an outlying radio station disabled by a condition applied at the outlying radio station, positive battery, 130 volts, for instance, connected to the simplex at the central control station, is replaced by negative battery, 130 volts, for instance. This releases relay R11 and operates relays R10 and R8 in a manner heretofore described. When relay R11 releases the path through which relay R7 operates is opened at contact 1 of relay R11. However, relay R7 is a slow-to-release relay and it remains operated until relay R8 is operated and supplies a holding ground for relay R7, over a path from ground through contact 2 of relay R8 and contact 2 of relay R7 to battery, maintaining relay R7 operated and the radio transmitter turned off.

*Simplex repeater circuit*

Figure 3:
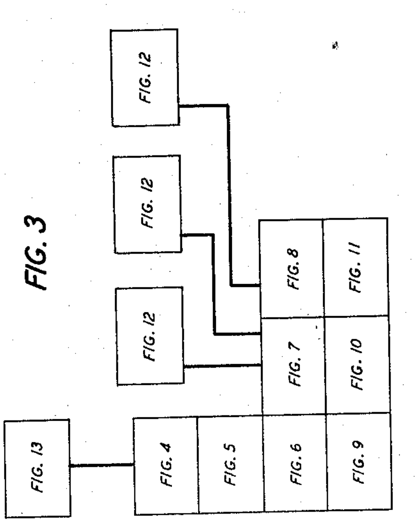
Fig. 3 is a diagram showing another disposition of the circuit figures of the system, differing from the arrangement of Fig. 2 only in that it includes an additional figure, Fig. 5, which is on occasion required, for reasons to be explained.
Figure 5:
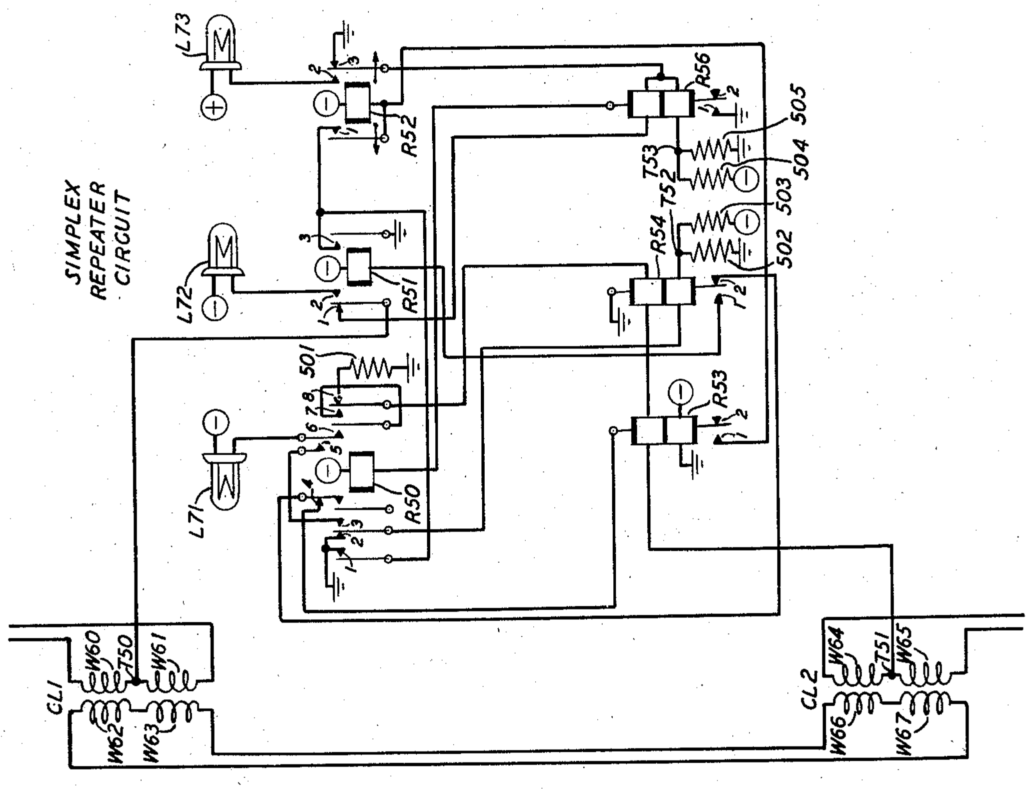
Fig. 5 is a simplex repeater circuit employed on occasion intermediate an outlying radio station and the central control station.

As shown in Fig. 3, the simplex repeater circuit of Fig. 5 is at times interposed between the central control station and an outlying radio station. This is done when the distance between the two stations is so great that a repeater is required to extend the range over which satisfactory signals can be transmitted over the simplex.

The simplex repeater circuit, hereinafter to be termed the repeater circuit, performs the following functions:

It provides means for repeating negative signals, negative 130-volt signals, for instance, in each direction.

It provides means for repeating positive signals, positive 130-volt signals, for instance, from the central control station to the radio station.

It provides means for repeating dispatcher "overcall" signals when the circuit is in use by the outlying radio station.

*Outgoing call from outlying radio station when simplex repeater is used*

Refer now to Fig. 5.

The repeater is interposed in the line between any radio station and the central control station by opening the talking pair at the repeater point and connecting the two conductors to the outlying radio station to windings W60 and W61 of coil CL1 and connecting the two conductors to the central control station to windings W64 and W65 of coil CL2, Fig. 5.

When a call is originated at the outlying radio station negative battery, negative 130 volts, for instance, is transmitted over the simplex. The circuit may be traced in Fig. 5 from terminal T50 through contact 1 of relay R51, top winding of relay R56 and contact 3 of relay R52 to ground. A circuit may be traced from negative battery through resistors 504, terminal T53 and resistor 505 to ground. From terminal T53 a circuit may be traced through the bottom winding of relay R56 and contact 3 of relay R52 to ground. The effect of the current flowing in the bottom or biasing winding of relay R56 tends to actuate the armature of relay R56 toward its contact 2. Normally when both ends of the simplex are grounded, any current flowing in the top winding of relay R56 will be due to a difference in ground potential between the two ends. The current in the bottom or biasing winding of relay R56 is effective to maintain the armature of relay R56 in engagement with its contact 2, notwithstanding any opposing effect in the top winding of relay R56 due to a difference of potential of a particular polarity, not exceeding 25 volts, between the normally grounded terminals of the simplex. Normally, therefore, the armature of relay R56 is maintained in engagement with its contact 2, as shown in Fig. 5. For the present condition, when the radio station calls and negative 130-volt battery, for instance, is applied to the end of the simplex at the radio station, the effect of the current in the upper winding of relay R56 preponderates and its direction is such that the armature of relay R56 is actuated to engage its contact 1. Ground is then connected through contact 1 of relay R56 and the winding of relay R50 to battery, operating relay R50. This disconnects ground through resistor 501 from the end of the simplex at the repeater, and connects negative battery, negative 130 volts, for instance, through the filament of lamp L71, contacts 6 and 7 of relay R50, in series, top winding of relay R54, top winding of relay R53, terminal T51, windings W64 and W65 of coil CL2, in parallel, and over the line to the central control station. The armature of relay R53 is actuated to engage its contact 1 against the influence of current in its bottom or biasing winding through an obvious circuit. Notwithstanding the closure of contact 1 of relay R53, it is ineffectual at this time to operate relay R52, which remains released, as shown, as relay R50 is operated and its contact 4 is open. The negative battery applied at the repeater end of the simplex of the line to the central control station through the filament of lamp L71 is effective at the central control station to produce the necessary signals to complete the call.

*Outgoing call from dispatcher's bridge when simplex repeater is used*

When a call is originated at the central control station, negative battery, negative 130 volts, for instance, is applied, in a manner explained in the foregoing, to the end of the simplex at the central control station and the circuit at the repeater station is extended from terminal T51 through the top winding of relay R53, top winding of relay R54, contact 8 of relay R50 and resistor 501, which may be 3000 ohms, for instance, to ground. In this case the armature of relay R54 is actuated so that it engages its contact 1. A circuit may then be traced from ground through contact 1 of relay R54 and the winding of relay R51 to battery operating relay R51. The operation of relay R51, by opening its contact 1, disconnects the ground which was formerly supplied from contact 3 of relay R52, top winding of relay R56 and contact 1 of relay R51 to the repeater station end of the simplex extending to the outlying radio station. The closing of contact 2 of relay R51 connects negative battery, negative 130 volts, for instance, through the filament of lamp L72 to the repeater station end of the simplex circuit extending to the outlying radio station. The outlying radio station circuit is arranged to respond to this negative potential condition to complete the talking circuit.

*"Overcall" by dispatcher or police chief*

As explained heretofore, the present system is arranged to provide "overcall" features for the dispatcher and police chief. Calls in progress are interrupted and the circuit is assigned to either the dispatcher or police chief, whenever either is connected to a bridge at the central control station and originates a call. If a call is in progress incoming from an outlying radio station, negative potential, which may be 130 volts, for instance, is applied to the end of the simplex at the outlying radio station and relays R56 and R50 are operated as described in the foregoing. When relay R50 is operated, it supplies current through the top winding of relay R54 in a direction which tends to hold the armature of relay R54 in engagement with its contact 2. At the same time biasing current is supplied over a circuit from negative battery, which may be negative 130 volts for instance, through contacts 5 and 3 of relay R50 and the bottom winding of relay R54 to terminal T52 in a potentiometer circuit, which may be traced from negative battery through resistor 503, terminal T52 and resistor 502 to ground. The effect of the current flowing through the lower or biasing winding of relay R54 tends to actuate the armature of relay R54 to engage with its contact 1, but the effect of the current in the upper winding, tending to actuate the armature of relay R54 to engage with its contact 2, is preponderant and the armature of relay R54 is maintained in engagement with its contact 2. When the dispatcher or police chief initiates a call, ground at the bridge circuit in the central control station is removed from the end of the simplex circuit thereat and is replaced by negative potential, which may be negative 130 volts, for instance. This negative potential opposes the negative potential connected to the opposite end of the simplex in the repeater circuit and since the potentials are each of the same magnitude, the current in the top winding of relay R54 is reduced to approximately zero. The current in the biasing winding remains unchanged and its effect actuates the armature of relay R54 to engage with its contact 1. A circuit may then be traced from ground through contact 1 of relay R54 and the winding of relay R51 to battery operating relay R51. The operation of relay R51 connects negative potential, which may be negative 130 volts, for instance, through the filament of lamp L72 and contact 2 of relay R51, at the repeater station, to the simplex circuit extending to the outlying radio station. This reduces the simplex current in this circuit to approximately zero and at the outlying radio station bridge this reduction in current is effective to transfer the control of the outlying radio station bridge to the dispatcher or police chief at the central control station. The manner in which the circuits at the outlying radio station function to achieve this is the same as had been explained in the foregoing. When relay R51 operates, the armature of relay R56 is actuated to engage with its contact 2 under the influence of current in its bottom or biasing winding, since the circuit through its top winding is open at contact 1 of relay R51. The removal of ground from contact 1 of relay R56 in turn releases relay R50. The release of relay R50, by closing its contact 2, reconnects ground to the left-hand terminal of the bottom winding of relay R54, reversing the direction of the biasing current therein. The release of relay R50, by closing its contact 8, reconnects ground through resistor 501 to the right-hand terminal of the top winding of relay R54 and maintains the armature of relay R54 in engagement with its contact 1.

*Remote control of transmitter at outlying radio station*

It was explained in the foregoing that the present system is arranged so that the radio transmitter at any outlying station may be remotely disabled by a condition applied to its associated simplex at the central control station. It was explained also that these transmitters were disabled by connecting positive potential, positive 130 volts, for instance, to the termination of the simplex circuit at the central control station. The effect of this current at the repeater station actuates the armature of relay R53 to engage with its contact 1. The armature of relay R54, however, remains in engagement with its contact 2. A circuit may then be traced from ground through contact 2 of relay R54, contact 4 of relay R50, contact 1 of relay R53 and the winding of relay R52 to battery operating relay R52. The operation of relay R52 connects positive battery to both windings of relay R56. The circuit may be traced from positive battery, which may be positive 130 volts, for instance, through the filament of lamp L73 and contact 2 of relay R52 to the junction of the two windings of relay R56. From the junction one path extends through the top winding of relay R56 and contact 1 of relay R51 to terminal T50 and out over the line to the outlying radio station. From the junction of relay R56 another path extends through the bottom winding of relay R56 to terminal T53 in the potentiometer circuit which latter has been traced from negative battery through resistor 504, terminal T53 and resistor 505 to ground. The positive battery connected to the right-hand terminal of the bottom winding of relay R56 meets negative battery at terminal T53 on the left-hand side of the winding, so that the current in the bottom or biasing winding is substantially increased. This prevents the operation of relay R56 due to the effect of the current in the top winding. The effect of the positive battery at the outlying radio station bridge disables the associated radio transmitter. The response of the circuits at the outlying radio station to the positive poential condition was described in the foregoing.

*Outgoing call from radio station with transmitter remotely disabled*

When a call is originated from an outlying radio station bridge at which the radio transmitter has been remotely disabled, ground on the simplex circuit at the outlying station is replaced by negative battery, such as negative 130 volts, for instance. The effect of this increases the line current in the top winding of relay R56 sufficiently to overcome the effect of the biasing current in its bottom winding and relay R56 operates. The operation of relay R56 in turn operates relay R50 as heretofore described. The operation of relay R50 replaces ground on the simplex circuit extending to the central control station with negative battery, to complete the call in the same manner as described above. When relay R50 operates, the operating path for relay R52 is opened at contact 4 of relay R50. However, a holding path for relay R52 is established from ground through contact 1 of relay R50, contact 1 of relay R52 and the winding of relay R52 to battery holding relay R52 operated. When relays R56 and R50 release at the end of the call, relay R52 remains operated and maintains positive battery, positive 130 volts, for instance, connected to the simplex at the repeater circuit to keep the radio transmitter at the outlying radio station disabled.

*Call originated at the central control station with the transmitter remotely disabled*

When a call is originated at the central control station, while the transmitter at the outlying radio station is remotely disabled, it has been shown that positive battery, positive 130 volts, for instance, is replaced with negative battery, negative 130 volts, for instance, at the central control station. At the repeater station, responsively, the armatures of relays R53 and R54 are actuated to engage with their contacts 2 and 1, respectively. The engagement of the armature of relay R54 with its contact 1, in turn operates relay R51. This replaces the positive battery, connected at the repeater station to the simplex circuit extending to the outlying radio station, with negative battery by opening its contact 1 and closing its contact 2. The reasons for this should be understood from the foregoing. At the outlying radio station bridge, the reversal of the battery polarity on the simplex circuit permits the call to be completed without applying the call to the radio transmitter. The manner in which the circuit at the outlying radio station functions have been explained in detail herein. When relay R53 is released, the operating path for relay R52 is opened. However, relay R52 is a slow-to-release relay and it remains operated until a holding path is established, which may be traced from ground through contact 3 of relay R51, contact 1 of relay R52 and the winding of relay R52 to battery. Thus, when the call is completed, negative battery, negative 130 volts, for instance, on the simplex is replaced with positive battery, positive 130 volts, for instance, to maintain the radio transmitter at the outlying radio station disabled.

What is claimed is:

1. In a radio telephone system, a central control station, a plurality of outlying radio stations, an individual simplex circuit interconnecting said control station to each of said outlying stations, each said simplex circuit comprising means for talking and means for signaling between said control station and the connected radio station, a plurality of bridge circuits at said control station, and individual bridge connector circuit at said control station for each of said lines at each of said bridges, actuating means connected to said connector circuits for selectively connecting any of said lines to any one or more of said bridges, and means connected to said simplex circuits at said central control station, responsive to a call initiated at any of said radio stations for operatively extending said call through said one or more bridges to which said calling radio station is connected to all other of said radio stations connected to the same bridge or bridges.

2. A system in accordance with claim 1, said system having an individual amplifier connected to each of said plurality of bridges, said amplifier having an input circuit and an output circuit, and means connected to said simplex circuit, at said central control station, responsive to the initiation of said call for connecting said calling station through its said connected bridge or bridges through the input to the output of the amplifier individual to said bridge or bridges to all other of said radio stations connected to said same bridge or bridges.

3. A system in accordance with claim 1, a dispatcher circuit at said central control station and means responsive to the initiation of a call by said dispatcher circuit for effectively connecting said dispatcher circuit to all of said outlying radio stations.

4. A system in accordance with claim 1, a plurality of telephone circuits at said central control station, an individual telephone connector circuit for each of said telephone circuits for each of said bridges, means responsive to the actuation of any one or more of said telephone connector circuits for selectively connecting its individual telephone circuit to one or more of said bridges, and means responsive to said connection of said telephone circuit to said bridge or bridges for controlling said simplex circuits so as to effectively connect said connected telephone circuit to all of said plurality of radio stations connected to the same bridge or bridges to which said telephone circuit is connected.

5. A radio telephone system comprising a plurality of outlying radio stations connected through an individual simplex line circuit to a central control station, a plurality of communication bridges at said central control station, said bridges comprising means, including switching elements connected to said simplex circuit, for interconnecting said radio stations in intercommunicating groups of said plurality of outlying stations, control means individual to each of said lines and each of said bridges for selectively connecting any of said lines with any one or more of said bridges in any combination, and means responsive to the initiation of a call at any of said outlying radio stations for effectively communicating simultaneously through said one or more connected bridges to all other of said outlying radio stations effectively connected to said one or more bridges at the time.

6. A system in accordance with claim 5, a telephone circuit at said central control station, means at said central station for selectively connecting said telephone circuit to any one or more of said bridges and means responsive to the initiation of a call by said telephone circuit for effectively connecting said telephone circuit through said one or more bridges to which said telephone circuit is connected, to all of said outlying radio stations connected to the same one or more bridges to which said telephone circuit is connected.

7. A system in accordance with claim 5, a telephone circuit at said central control station, means at said central control station for selectively connecting said telephone circuit to any one or more of said bridges, means responsive to the initiation of a call by said telephone circuit for effectively connecting said telephone circuit through said one or more bridges to which said telephone circuit is connected, to all of said outlying radio stations connected to said same one or more bridges to which said telephone circuit is connected, and means responsive to the initiation of said call by said telephone circuit for preempting said one or more bridges, to which said telephone circuit is connected, over a call in progress thereover.

8. A system in accordance with claim 5, a plurality of telephone circuits at said central control station, means for selectively connecting said telephone circuits to any one or more of said bridges, means responsive to the initiation of a call by a first of said telephone circuits for effectively connecting said first telephone circuit to all of said outlying radio stations connected to said one or more bridges to which said first telephone circuit is connected and means responsive to the initiation of a call by a second of said plurality of telephone circuits for preempting communication through said one or more bridges to which said first telephone circuit is connected and the outlying radio stations thereto connected from said first telephone circuit.

9. A radio telephone system having a central control station and a plurality of outlying radio stations, a plurality of bridge circuits at said central control station, an individual bridge circuit at each of said radio stations, an individual communication and signaling circuit connected to each of said bridge circuit at said radio station extending to said central control station and connectable in parallel to each of said plurality of bridge circuits, switching means at said central control station, responsive to manual controls thereat, for selectively connecting said communication and signaling circuits individually to one or more of said bridge circuits at said control station, so as to interconnectably arrange said radio stations in intercommunicating groups, as desired, and means, comprising said signaling circuit, responsive to the initiation of a call from any of said radio stations, for effectively interconnectng the calling station through said bridge or bridges for communication with all other radio stations of its respective group.

10. A system in accordance with claim 9 having a plurality of mobile radio circuits and a plurality of land telephone lines individual to each of said radio stations, means for operatively interconnecting each of said mobile circuits through said bridge at its respective radio station with said system, and means for operatively interconnecting each of said land telephone lines through said bridge at its respective radio station into said system.

11. A system in accordance with claim 9, a dispatcher telephone circuit at said central control station and means for operatively interconnecting said telephone circuit to any one or more of said bridges at said central control station.

12. A system in accordance with claim 9, a dispatcher telephone circuit at said central control station, means for operatively interconnecting said telephone circuit to any one or more of said bridges at said central control station and means, responsive to said connection of said telephone circuit, for preempting communication by said telephone circuit over calls in progress from any of said radio stations connected to the same bridge or bridges at said central control station to which said telephone circuit is connected.

13. A system in accordance with claim 9, a first and second telephone circuit at said central control station, individual means at said central control station for effectively interconnecting said telephone circuits selectively to one or more of said bridges at said central control station, means connected to each of said telephone circuits for preempting control of communication by either of said telephone circuits over a call in progress, between said radio stations, over the same bridge or bridges, at said central control station, to which either of said telephones is effectively connected and other means connected to said first of said telephone circuits for preempting control of communication by said first telephone circuit over the same bridge or bridges, at said central control station, to which said first and said second telephones are connected, over a call in progress thereover from said second telephone circuit.

14. A system in accordance with claim 14, an individual radio transmitter connected to said bridge at each of said radio stations, and individual means connected to said signaling circuits at said central control station for selectively disabling said radio transmitters.

15. A system in accordance with claim 9, a radio transmitter and a telephone circuit, each connected individually to each of said bridge circuits at said outlying radio stations, a telephone circuit connectable to one or more of said bridges at said central control station, means at said central control station, connected to said signaling circuits, for disabling said transmitters, and means responsive to the initiation of a call by said telephone circuit at said central control station, for communicating through said bridges and said communication circuits to said telephone circuits connected to said bridges at said radio stations, notwithstanding the cutting off of said transmitters.

16. A system in accordance with claim 9, a radio transmitter and a radio receiver connected to each of said bridges at said radio stations, means at each of said radio stations for effectively disconnecting its individual transmitter from its respective bridge, and means at said radio station whereat said transmitter is disconnected for communcating through its individual radio receiver, its indivdual bridge and communication circuit and its connected bridge or bridges at said central control station to other radio stations connected to the same bridge or bridges at said central control station, notwithstanding the cutting off of said transmitter.

17. In a radio telephone system, a central control station having a first communication bridge circuit and a first telephone circuit connectable to said bridge circuit, a simplex repeater station having a simplex repeater circuit thereat, an outlying radio station having a second communication bridge circuit thereat, a radio transmitter, a radio receiver and a second telephone circuit, at said outlying station, all connectable to said second bridge circuit, a simplex circuit comprising a talking and signaling path interconnecting said first bridge through said repeater circuit to said second bridge, and means responsive to conditions applied to said simplex circuit for selectively controlling communication over said system between said circuits connected to said bridges.

References Cited in the file of this patent

UNITED STATES PATENTS

| | | |
|---|---|---|
| 2,475,675 | Peterson | July 12, 1949 |
| 2,501,986 | Brockman | Mar. 28, 1950 |
| 2,575,782 | Bartelink | Nov. 20, 1951 |
| 2,623,164 | Herrick | Dec. 23, 1952 |
| 2,629,092 | Herrick | Feb. 17, 1953 |
| 2,649,540 | Homrighous | Aug. 18, 1953 |